United States Patent
Ptucha et al.

(10) Patent No.: US 8,390,648 B2
(45) Date of Patent: *Mar. 5, 2013

(54) DISPLAY SYSTEM FOR PERSONALIZED CONSUMER GOODS

(75) Inventors: Raymond W. Ptucha, Honeoye Falls, NY (US); William J. Bogart, Williamson, NY (US); Laura R. Whitby, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 581 days.

This patent is subject to a terminal disclaimer.

(21) Appl. No.: 12/648,333

(22) Filed: Dec. 29, 2009

(65) Prior Publication Data

US 2011/0157226 A1 Jun. 30, 2011

(51) Int. Cl.
*G09G 5/14* (2006.01)

(52) U.S. Cl. ........................................ 345/638

(58) Field of Classification Search ............ 345/638
See application file for complete search history.

(56) References Cited

U.S. PATENT DOCUMENTS

| | | | |
|---|---|---|---|
| 5,459,819 A | 10/1995 | Watkins | |
| 5,815,645 A | 9/1998 | Fredlund et al. | |
| 5,986,671 A | 11/1999 | Fredlund et al. | |
| 6,285,468 B1 | 9/2001 | Cok et al. | |
| 6,389,181 B2 * | 5/2002 | Shaffer et al. | 382/305 |
| 6,476,903 B1 | 11/2002 | Slater et al. | |
| 6,636,648 B2 | 10/2003 | Loui et al. | |
| 6,711,291 B1 | 3/2004 | Stubler et al. | |
| 6,748,097 B1 | 6/2004 | Gindele et al. | |
| 6,813,618 B1 | 11/2004 | Loui et al. | |
| 6,822,756 B1 | 11/2004 | Cok et al. | |
| 6,868,190 B1 | 3/2005 | Morton | |
| 6,919,892 B1 * | 7/2005 | Cheiky et al. | 345/473 |
| 6,956,671 B2 | 10/2005 | Monty et al. | |
| 6,958,821 B1 | 10/2005 | McIntyre | |
| 6,967,667 B2 | 11/2005 | Dworsky et al. | |
| 6,992,787 B2 | 1/2006 | Fredlund et al. | |
| 7,000,192 B2 | 2/2006 | Allen et al. | |
| 7,003,731 B1 * | 2/2006 | Rhoads et al. | 715/768 |
| 7,035,467 B2 | 4/2006 | Nicponski | |
| 7,043,053 B1 | 5/2006 | Patton et al. | |
| 7,092,966 B2 | 8/2006 | McIntyre | |
| 7,340,676 B2 | 3/2008 | Geigel et al. | |
| 7,362,919 B2 * | 4/2008 | Das et al. | 382/284 |
| 7,533,129 B2 * | 5/2009 | McIntyre | 1/1 |
| 7,577,611 B2 * | 8/2009 | Heit et al. | 705/42 |

(Continued)

OTHER PUBLICATIONS

Modeling naturalistic affective states via facial and vocal expressions recognition George Caridakis, Lori Malatesta, Loic Kessous, Noam Amir, Amaryllis Raouzaiou, Kostas Karpouzis Nov. 2006 ICMI '06: Proceedings of the 8th international conference on Multimodal interfaces Publisher: ACM.*

*Primary Examiner* — Javid A Amini
(74) *Attorney, Agent, or Firm* — Raymond L. Owens

(57) ABSTRACT

A computer implemented method of generating an image display. A database stores images of products to be sold by a merchant and templates for organizing a display of the images. The templates each have attributes matching a particular product inventory and images of particular products can be disposed in preselected and predesigned locations in the template. When an inventory of products offered for sale by the merchant changes or is updated, then the template attributes can be changed to reflect the current inventory. The current product images can then be displayed within a template on at least one electronic display.

19 Claims, 14 Drawing Sheets

U.S. PATENT DOCUMENTS

| | | | |
|---|---|---|---|
| 8,007,450 B2 * | 8/2011 | Williams | 600/595 |
| 8,056,802 B2 * | 11/2011 | Gressel et al. | 235/382 |
| 8,154,384 B2 * | 4/2012 | Hirai | 340/5.83 |
| 2003/0154141 A1 * | 8/2003 | Capazario et al. | 705/27 |
| 2008/0167106 A1 * | 7/2008 | Lutnick et al. | 463/16 |
| 2009/0059270 A1 * | 3/2009 | Opalach et al. | 358/1.15 |
| 2010/0199166 A1 * | 8/2010 | Fisk, III | 715/230 |
| 2011/0134248 A1 * | 6/2011 | Heit et al. | 348/161 |
| 2011/0157218 A1 * | 6/2011 | Ptucha et al. | 345/619 |
| 2011/0161245 A1 * | 6/2011 | Hollas | 705/36 R |
| 2011/0286638 A1 * | 11/2011 | Tedesco et al. | 382/115 |
| 2012/0022902 A1 * | 1/2012 | Gressel et al. | 705/5 |
| 2012/0170818 A1 * | 7/2012 | Hirai | 382/118 |

* cited by examiner

<METADATUM LABEL="EASTMANKODAKCOMPANY" TAG="FAVORITE" DATUM="1" />
<METADATUM LABEL="EASTMANKODAKCOMPANY " TAG="FAVORITEWEIGHT" DATUM="20" />
<METADATUM LABEL="EASTMANKODAKCOMPANY " TAG="FACIALCLOSETONUM" DATUM="2" />
<METADATUM LABEL="EASTMANKODAKCOMPANY " TAG=" FACIALCLOSETONUM WEIGHT" DATUM="40" />
<METADATUM LABEL="EASTMANKODAKCOMPANY " TAG="FACIALPOSE" DATUM="FRONT" />
<METADATUM LABEL="EASTMANKODAKCOMPANY " TAG="FACIALPOSEWEIGHT" DATUM="20" />
<METADATUM LABEL="EASTMANKODAKCOMPANY " TAG="LOCATION" DATUM="INDOOR" />
<METADATUM LABEL="EASTMANKODAKCOMPANY " TAG="LOCATIONWEIGHTWEIGHT" DATUM="10" />
<METADATUM LABEL="EASTMANKODAKCOMPANY " TAG="OFFSETUR" DATUM="1" />
<METADATUM LABEL="EASTMANKODAKCOMPANY " TAG="FACEFILL" DATUM="0.2" />

*FIG. 4*

|  | FAVORITE IMAGE | | FACIAL | | POSE | | LOCATION | | |
|---|---|---|---|---|---|---|---|---|---|
|  | VALUE | WEIGHTED VALUE | VALUE | WEIGHTED VALUE | VALUE | WEIGHTED VALUE | VALUE | WEIGHTED VALUE | TOTAL SCORE |
| IMAGE 1 | 0 | 0 | 0.5 | 20 | 1 | 20 | 1 | 9 | 49 |
| IMAGE 2 | 1 | 20 | 0.5 | 20 | 1 | 20 | 0.7 | 7 | 67 |
| IMAGE 3 | 0 | 0 | 0.5 | 20 | 1 | 20 | 0.25 | 2.5 | 42.5 |
| IMAGE N | 1 | 20 | 0.5 | 20 | 0.25 | 5 | 1 | 10 | 55 |

*FIG. 5*

| EXAMPLES OF RECORDED METADATA TAGS |
|---|

- TIME/DATE (FROM DIGITAL CAMERA CLOCK)
- GPS LOCATION DATA (FROM CAMERA/CELL PHONE CAM GPS)
- IMAGE ORIENTATION (FROM CAMERA ORIENTATION SENSOR)
- IMAGE SIZE (RESOLUTION, FORMAT, COMPRESSION)
- IMAGE TYPE
- IMAGE SEQUENCE (1 OF N)
- CAPTURE MODE SETTING (SPORTS, PORTRAITS, MACRO, ETC)
- CAMERA SETTINGS (SHUTTER SPEED/F/STOP)
- CAMERA TYPE/MODEL
- CALLER ID IMAGE (E.G. DESIGNATED IMAGE ASSOCIATED WITH PHONE NUMBER)
- FLASH STATUS (ON/OFF/FILL)
- FOCUS POSITION (INDICATION OF MAIN SUBJECT OR REGION OF INTEREST)
- IMAGE HISTOGRAM (GRAPHIC REPRESENTATION OF THE RANGE OF TONES IN A PHOTO)
- ZOOM SETTING
- "SHARE" DESIGNATION (SHARE AND/OR FAVORITE DESIGNATION)
- "NO ERASE" DESIGNATION (PREVENTS INADVERTENT DELETION)
- "DPOF" DESIGNATION (DIGITAL PRINT ORDER FORMAT)
- "PERFECT TOUCH" APPLICATION (RED EYE/TONE SCALE CORRECTION HAS BEEN APPLIED).
- PRINT HISTORY (IMAGE HAS BEEN PRINTED N TIMES)
- STORAGE HISTORY (IMAGE HAS BEEN STORED OR BACKED UP AT X LOCATION)
- EDITING HISTORY (IMAGE HAS BEEN DIGITALLY MANIPULATED)
- VIDEO SEQUENCE DURATION
- VIDEO ENCODING TYPE (MPEG2, MPEG4, ETC.)
- VIDEO "KEY FRAME" DESIGNATION
- VIDEO "STILL FRAME" DESIGNATION
- WHITE BALANCE SETTING
- WALLPAPER IMAGE (CELL PHONE CAMERA DESIGNATED DEFAULT SCREEN IMAGE)
- TOTAL ASSET QUANTITY (NUMBER OF IMAGES, AMOUNT OF VIDEO, MUSIC DURATION)

*FIG. 13*

| EXAMPLES OF EXTRACTED METADATA TAGS |
|---|
| ❏ SIGNIFICANT DATE "GENERAL" (HOLIDAY, 4$^{TH}$ OF JULY, CINCO DE MAYO, NEW YEARS EVE, YOM KIPPUR, HALLOWEEN, X-MAS ETC.).<br>❏ SIGNIFICANT DATE "PERSONAL" (DERIVED FROM USER PROFILE OR DIGITAL "DATE BOOK", PHONE LIST AND/OR E-MAIL LIST INCLUDES; BIRTHDAYS, ANNIVERSARIES, WEDDINGS, ETC.).<br>❏ EVENT "TEMPORAL" (SERIES OF ASSETS RECORDED WITHIN A DEFINED SPAN OF TIME).<br>❏ EVENT "SPATIAL" (SERIES OF ASSETS RECORDED WITHIN A DEFINED LOCATION OR REGION) (GPS + LUT LATITUDE AND LONGITUDE BECOME; 123 MAIN ST. OR "MOM'S HOUSE").<br>❏ EYE PAIR ANALYSIS (EYES IDENTIFIED, PERSON IN SCENE)<br>❏ EYE PAIR COUNT (DESIGNATES AN INDIVIDUAL, SMALL GROUP, OR LARGE GROUP)<br>❏ EYE SEPARATION DISTANCE (INDICATES SUBJECT DISTANCE, FAR SEPARATION INDICATES PORTRAIT, CLOSE SEPARATION INDICATES DISTANT SUBJECT, CAN BE USED WITH FOCUS OR ZOOM POSITION)<br>❏ EYE SEPARATION DIFFERENTIAL (INDICATES RELATIVE DISTANCE OF MULTIPLE HUMAN SUBJECTS)<br>❏ EYE PAIR LOCATION DETERMINATION AND COORDINATE DESIGNATION (COMPOSITION INDICATION)<br>❏ EYE SEPARATION RELATIVE TO HEAD SIZE TO DETERMINE IF THE SUBJECT IS A CHILD OR AN ADULT.<br>❏ FACE IDENTIFICATION (HUMAN FACE OR FACES AUTOMATICALLY IDENTIFIED IN AN IMAGE)<br>❏ FACE RECOGNITION (HUMAN FACE OR FACES AUTOMATICALLY RECOGNIZED IN AN IMAGE)<br>❏ ANIMAL RECOGNITION (IDENTIFYING COMMON ANIMALS SUCH AS CATS, DOGS, AND HORSES)<br>❏ OBJECT RECOGNITION (SNOW, BEACH, WATER, GRASS, SIGNS, BUILDINGS, CARS, ETC.)<br>❏ TEXT RECOGNITION (IDENTIFYING AND DECIPHERING TEXT FROM SIGNS, CLOTHING, AND TEAM UNIFORMS)<br>❏ COLLABORATIVE METADATA INFERENCES (TIME/DATE = 7:45AM, 12/25/2006, LOCATION = HOME, IMAGE CONTENT = MULTICOLOR HIGHLIGHTS, CHILDREN, LARGE GREEN OBJECT IN THE SCENE, ... THE INFERENCE IS = "CHRISTMAS MORNING AT HOME")<br>❏ AUDIO METADATA (VOICE/SPEECH RECOGNITION, AUDIO HISTOGRAMS, RECOGNIZED SOUNDS, CHEERING, LAUGHTER, RECOGNIZED SONGS, ETC.)<br>❏ VOICE COMMAND/MENU SELECTION (SHORT LIST OF WORDS OR COMMANDS TRAINED BY USER)<br>❏ AUDIO EDITING CUES (SOCCER GAME, USING A CROWD CHEERING TO IDENTIFY SIGNIFICANT EVENT)<br>❏ CONTEXT SENSITIVE METADATA; ALL OF THE METADATA OBTAINED FROM AN ASSET OR ASSET GROUP SHOULD BE UTILIZED TO OBTAIN A "BEST GUESS" INFERENCE |

*FIG. 14*

DISPLAY SYSTEM FOR PERSONALIZED CONSUMER GOODS

CROSS REFERENCE TO RELATED APPLICATIONS

Reference is made to commonly assigned, co-pending U.S. patent applications:

Ser. No. 12/512,067 by Ptucha et al., filed Jul. 30, 2009 entitled "System for Matching Artistic Attributes of Secondary Image and Template to a Primary Image";

Ser. No. 12/648,329 by Ptucha et al. filed of even date herewith entitled "Camera and display system interactivity";

Ser. No. 13/648,323 by Bogart et al. filed of even date herewith entitled "Method for Interactive Display";

Ser. No. 12/648,357 by Bogart et al. filed of even date herewith entitled "Group Display System"; and Ser. No. 12/648,362 by Whitby et al. filed of even date herewith entitled "Method for Group Interactivity," the disclosures of which are incorporated herein by reference in their entireties.

FIELD OF THE INVENTION

The present invention relates to computer systems, methods, and software programs for use in making digital image products and digital image displays. In particular, the present methods and apparatuses automatically search for, find, evaluate, and arrange digital images in a digital image template according to programmed artistic designs.

BACKGROUND OF THE INVENTION

Personalized image collages, clothing, albums and other image enhanced items are becoming increasingly more accessible as digital printing technologies improve. However, as personalized image bearing products have become more accessible, consumers have become more discriminating. In particular, consumers now seek methods and systems that produce customized image products in a more convenient, faster, seamless, automatic, and integrated manner. While becoming somewhat more common, many items for displaying and/or including embedded customized images are still considered novelties. Methods for recognizing image contents that fulfill a predescribed aesthetic appearance often fall short of expectations. For example, many products with customizable embedded images include photos of people. For this type of product, it would be desirable to identify images that satisfy preselected artistic criteria and/or image attributes, such as number of persons pictured, who is pictured, what zoom ratio, temporal aspects, clothing, background, season, facial expressions, hue, colorfulness, texture, and sharpness, etc. Because some artistic aesthetic elements work better for certain product formats, it would also be desirable if multiple image attributes including aesthetic criteria could be evaluated in parallel for a number of images, and the images with the highest fitness score be automatically determined by computer algorithm. Furthermore, customer satisfaction can be improved if the customer can select a favorite image, or several favorite images, to be included in an image enhanced product. Attributes from this favorite image can be extracted in real time from the image itself, read from a file associated with the image, such as a metadata file, a DPOF file, or a file stored by a user, or it can be generated in some other fashion, or even input directly by a user, and then be used in coordinating surrounding image and template contents. Conversely, attributes of a selected image product template can be used in coordinating which image or images from a user collection can be placed within the template. Furthermore, attributes of a context or of an environment where the image will be displayed can be input to a computer system and referenced to select appropriate templates and images, or any combination of these algorithms can be integrated in a computing system or method.

The problem in the prior art is the time consuming process requiring users to manually search through many images and compose their own artistic creations, for which they may not be capable.

SUMMARY OF THE INVENTION

A preferred embodiment of the present invention is a computer implemented method of generating an image display. A database stores images of products to be sold by a merchant and templates for organizing a display of the images. The templates each have attributes matching a particular product inventory and images of particular products can be disposed in preselected and predesigned locations in the template, referred to as template windows or template openings. When an inventory of products offered for sale by the merchant changes or is updated then the template attributes can be changed to reflect the current inventory. The current product images can then be displayed within a template on at least one electronic display.

Another preferred embodiment includes a computer implemented method of generating an image display, comprising the steps of storing a database of images comprising images of a product inventory, storing a plurality of templates each having template attributes and a designated location for disposing a digital image, capturing a digital image comprising a person and a plurality of image elements, selecting a digital image template whose template attributes match the product inventory; displaying on at least one electronic display within view of the person the person and at least one product from the product inventory which replaces at least one of the image elements. When the person gestures or the number of persons within the camera shot has changed, the template can be updated based on the gestures or persons within the camera shot and on the product inventory, and displaying on the at least one electronic display the person, the updated digital image template and the at least one product from the current product inventory.

Another preferred embodiment of the present invention is a computer implemented method of generating an image display comprising the steps of selecting a digital image template having template attributes and capable of having disposed within the template a preselected digital image, capturing the preselected digital image comprising a person and a plurality of image elements, modifying the captured preselected digital image for displaying a preselected service or product and displaying on at least one electronic display the modified captured preselected digital image comprising the person.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are not intended to be drawn to any precise scale with respect to size, angular relationship, or relative position.

BRIEF DESCRIPTION OF THE DRAWINGS

FIG. 4 illustrates programming of required image attributes with weighted values.

FIG. 5 illustrates a method and results of a compatibility score calculation.

FIG. 13 illustrates examples of recorded metadata.

FIG. 14 illustrates examples of extracted metadata.

DETAILED DESCRIPTION OF THE INVENTION

Figure 1A:
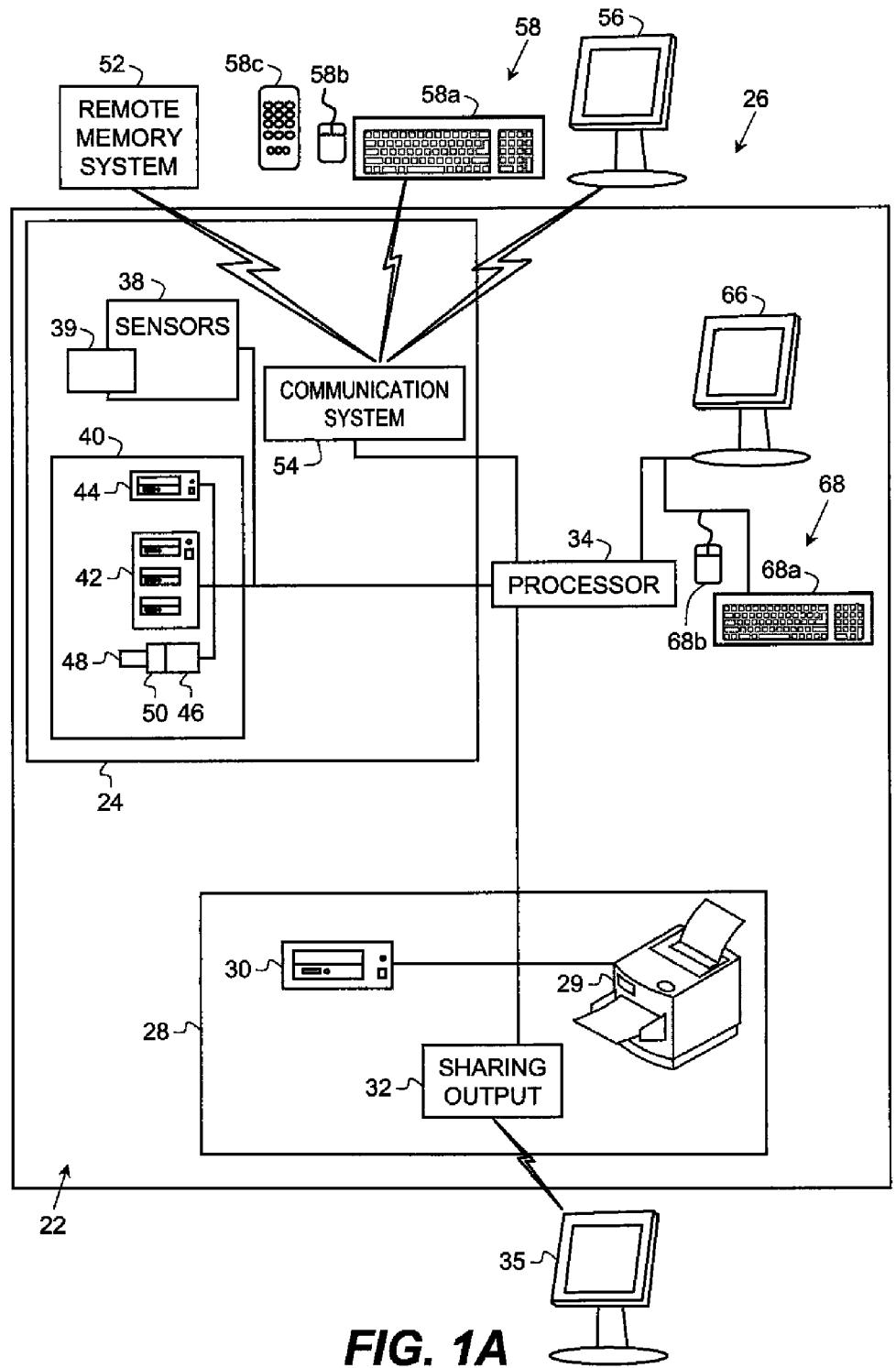
FIGS. 1A-B illustrate a server/workstation, large display, and image capture device computer systems for use in preferred embodiments of the present invention.

FIG. 1 illustrates a first embodiment of an electronic system 26, a computer system, for implementing certain embodiments of the present invention for automatically generating image enhanced products. In the embodiment of FIG. 1, electronic computer system 26 comprises a housing 22 and a source of content and program data files 24 such as software applications, template designs and recipes, image files, image attributes and required image attributes, which includes various memory and storage devices 40, a wired user input system 68 as well as a wireless input system 58, and an output system 28, all communicating directly or indirectly with processor 34. Although not shown processor 34 is meant to illustrate typical processor system and chip components such as instruction and execution registers, an ALU, various levels of cache memory, etc. The source of program and content data files 24, user input system 68, or output system 28, and processor 34 can be located within housing 22 as illustrated. In other embodiments, circuits and systems of the source of content and program data files 24, user input system 68 or output system 28 can be located in whole or in part outside of housing 22. As an example, element 68b illustrates a screen pointer control embodied as a mouse when located outside the housing 22 but can be an embedded trackball when located within housing 22.

The source of content or program data files 24 can include any form of electronic, optical, or magnetic storage such as optical discs, storage discs, diskettes, flash drives, etc., or other circuit or system that can supply digital data to processor 34 from which processor 34 can load software, template designs and recipes, derived and recorded metadata, image files, image attributes and required image attributes or derive images and image metadata for use in automatically forming an image enhanced item. In this regard, the content and program data files can comprise, for example and without limitation, software applications, a still image data base, image sequences, a video data base, graphics, and computer generated images, image attribute information associated with still, video, or graphic images, and any other data necessary for practicing embodiments of the present invention as described herein. Source of content data files 24 can optionally include devices to capture images to create content data for use in content data files by use of capture devices located at electronic computer system 20 and/or can obtain content data files that have been prepared by or using other devices or image enhancement and editing software. In the embodiment of FIG. 1, sources of content or program data files 24 includes sensors 38, a memory and storage system 40 and a communication system 54.

Sensors 38 are optional for particular embodiments of the present invention and can include light sensors, biometric sensors and other sensors known in the art that can be used to detect conditions in the environment of system 26 and to convert this information into a form that can be used by processor 34 of system 26. Sensors 38 can also include one or more digital still cameras, digital video cameras, scanners, microphones, PDAs, palm tops, laptops that are adapted to capture images and can be coupled to processor 34 directly by cable or by removing portable memory 39 from these devices and/or computer systems and coupling the portable memory to slot 46. Sensors 38 can also include biometric or other sensors for measuring involuntary physical and mental reactions. Such sensors including, but not limited to, voice inflection, body movement, eye movement, pupil dilation, body temperature, and p4000 wave sensors.

Memory and storage 40 can include conventional digital memory devices including solid state, magnetic, optical or other data storage devices, as mentioned above. Memory 40 can be fixed within system 26 or it can be removable and portable. In the embodiment of FIG. 1, system 26 is shown having a hard disk drive 42, which can be an attachable external hard drive, which can include an operating system for electronic computer system 26, and other software programs and applications such as the program algorithm embodiments of the present invention, a template design data base and a recipe data base, derived and recorded metadata, image files, image attributes and required image attributes, software applications, and a digital image data base. A disk drive 44 for a removable disk such as an optical, magnetic or other disk memory (not shown) can also include control programs and software programs useful for certain embodiments of the present invention, and a memory card slot 46 that holds a removable portable memory 48 such as a removable memory card or flash memory drive or other connectable memory and has a removable memory interface 50 for communicating with removable memory 48, if necessary. Data including, but not limited to, control programs, template designs and recipes, derived and recorded metadata, image files, image attributes and required image attributes, software applications, digital images and metadata can also be stored in a remote memory system 52 such as a personal computer, computer network, a network connected server, or other digital system.

In the embodiment shown in FIG. 1, system 26 has a communication system 54 that in this embodiment can be used to communicate with an optional remote input 58, remote memory system 52, an optional a remote display 56, for example by transmitting image designs in the form of template designs with or without merged images and receiving from remote memory system 52, a variety of control programs, template designs and recipes, derived and recorded metadata, image files data bases, image attributes, required image attributes, and software applications. Although communication system 54 is shown as a wireless communication system, it can also include a modem for coupling to a network over a communication cable for providing to the computer system 26 access to the network and remote memory system 52. A remote input station including a remote display 56 and/or remote input controls 58 (also referred to herein as "remote input 58") can communicate with communication system 54 wirelessly as illustrated or, again, can communicate in a wired fashion. In a preferred embodiment, a local input station including either or both of a local display 66 and local user input controls 68 (also referred to herein as "local user input 68") is connected to processor 34 which is connected to communication system 54 using a wired or wireless connection.

Communication system 54 can comprise for example, one or more optical, radio frequency or other transducer circuits or other systems that convert data into a form that can be conveyed to a remote device such as remote memory system 52 or remote display 56 using an optical signal, radio frequency signal or other form of signal. Communication system 54 can also be used to receive a digital image and other data, as exemplified above, from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system.

User input system 68 provides a way for a user of system 26 to provide instructions to processor 34, such instructions comprising automated software algorithms of particular embodiments of the present invention that automatically generate artistic coordinated image displays according to template recipes. This software also allows a user to make a designation of content data files, such as selecting image templates and designating primary images, to be used in automatically generating an image enhanced output product according to an embodiment of the present invention and to select an output form for the output product. User controls 68a, 68b or 58a, 58b in user input system 68, 58, respectively, can also be used for a variety of other purposes including, but not limited to, allowing a user to arrange, organize and edit content data files, such as coordinated image displays and image templates, to be incorporated into the image enhanced output product, for example, by incorporating image editing software in computer system 26 which can be used to override automated image enhanced output products generated by computer system 26, as described below in certain embodiments of the present invention, to provide information about the user or audience, to provide annotation data such as voice and text data, to identify characters in the content data files, and to perform such other interactions with system 26 as will be described later.

In this regard user input system 68 can comprise any form of device capable of receiving an input from a user and converting this input into a form that can be used by processor 34. For example, user input system 68 can comprise a touch screen input 66, a touch pad input, a 4-way switch, a 6-way switch, an 8-way switch, a stylus system, a trackball system, a joystick system, a voice recognition system, a gesture recognition system, a keyboard 68a, mouse 68b, a remote control or other such systems. In the embodiment shown in FIG. 1, electronic computer system 26 includes an optional remote input 58 including a remote keyboard 58a, a remote mouse 58b, and a remote control 58c. Remote input 58 can take a variety of forms, including, but not limited to, the remote keyboard 58a, remote mouse 58b or remote control handheld device 58c illustrated in FIG. 1. Similarly, local input 68 can take a variety of forms. In the embodiment of FIG. 1, local display 66 and local user input 68 are shown directly connected to processor 34.

Figure 1B:
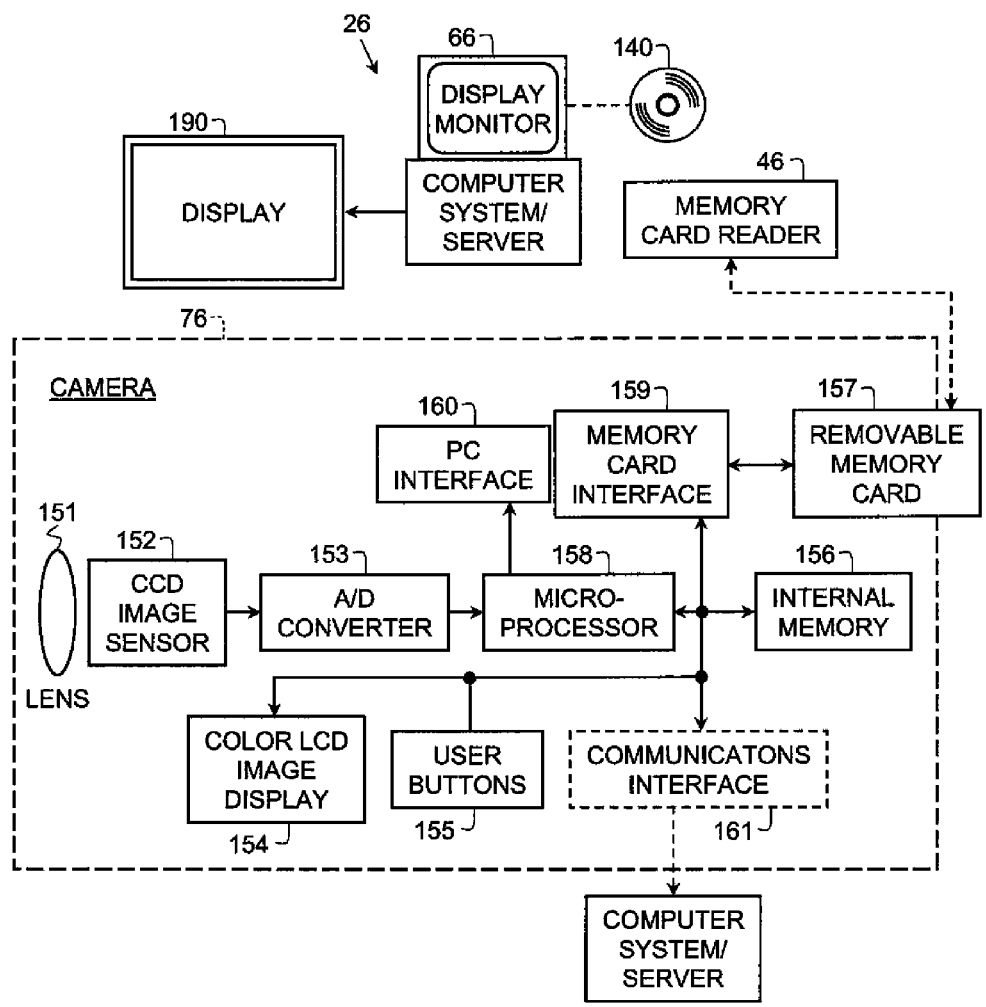

A simplified block diagram of a camera and storefront display system of the present invention is shown in FIG. 1B. In this illustration, a removable portable memory card 157 of the camera can be coupled to computer system server 26 via the computer system memory card reader 46, previously described. The camera 76 includes an optical section 151 for imaging a scene upon an image sensor 152 and generating an image signal, an A/D converter 153 for digitizing the image signal, and a liquid crystal display (LCD screen) 154 for displaying images, templates, recipes, as described below, and other information similar to that displayable upon computer display 66 described earlier. Other display screen technologies may be used, e.g. OLED displays, for example. A number of user input buttons 155, operating in a fashion similar to that of user input control section 68 described previously for the computer system 26, and both internal memory 156 and a removable memory card 157 for storing templates, recipes, captured images, digital video, image databases, image attributes, required image attributes, content files, software applications for image processing, etc., and other program algorithms, such as facial recognition, body position, gesture detection, etc, for execution by processor 158. Similar to computer system processor 34, camera processor 158 may include a plurality of instruction registers, an ALU, and caches for executing programs. Processor 158 may be manufactured as an integrated circuit on a single silicon chip or may be assembled as a chipset comprised of several silicon chips. The camera includes an internal communications interface 161 (e.g. wired or wireless modem). Camera 76 can include a camcorder for recording video or sufficient memory for recording digital video. The processor 158 generally controls the operation of the camera 76, and interchanges data through a memory card interface 159 with the memory card, and through a PC interface 160 with the computer system and/or server 26, through a direct computer system interface 160, or through the communications interface 161 with a wired or wireless communications network (not shown) to computer system and/or server 26. The camera can be hand carried by a cameraman or can be mounted to a stationary object, and can also be remotely controlled if stationary mounted.

The camera includes software applications for running on computer system 26 that enables the user to download applications through interface 160 into camera memory 156 or 157. The user can also select, through the software application, various program features of the application using buttons 155 to navigate through various menu features shown on display screen 154 which provides interactive feedback through a camera GUI, for example, as is well known in the art. All of this information can alternatively be preloaded on the camera during manufacturing or downloaded, via the web or a memory card reader 46 on the host computer system 26, to the removable memory card 157, which can be subsequently inserted into the camera. Typically, keyword descriptors accompany the information to enable easy access by the camera user.

A cameraman operates camera 76 to store images and/or video, which are stored either in the internal memory 156 or in the memory card 157 (or in both). After recording, the cameraman can review the images on the LCD screen 154, using the buttons 155 to scroll through the images or can upload video and images to server 26. Operators can, or under program control the server 26 can, select the desired template recipes and run the template recipe algorithms as will be described below in more detail. For example, operator options include selection of templates and recipes, selection of images and image manipulation software, and selection of template backgrounds and text.

These applications and options are stored in and accessed from server 26 or camera memory 156, memory card 157. The camera display screen can be used to monitor the look of a coordinated image template design in progress or a completed template design. The camera is connected to a wired or wireless modem, such as through communications interface 161. In this case, images and video are transmitted to computer system 26 which, in turn, processes received images according to recipe programs and transmits selected images to storefront display 190, which can also be simultaneously displayed on operator display 66 for monitoring purposes.

If the camera includes a transmitter, e.g., a network connection in the communications interface 161, the camera could include and initiate a "send" command that the cameraman would enable after recording motion or still images. This command automatically sends image data through the coupled network wirelessly to the central server using the appropriate communications protocol (FTP, mailto, etc.). Instead of, or in addition to, the cameraman transmits several completed image files via the network connected to the server, which is also be monitored by an operator or, alternatively, could be program controlled.

Figure 2:
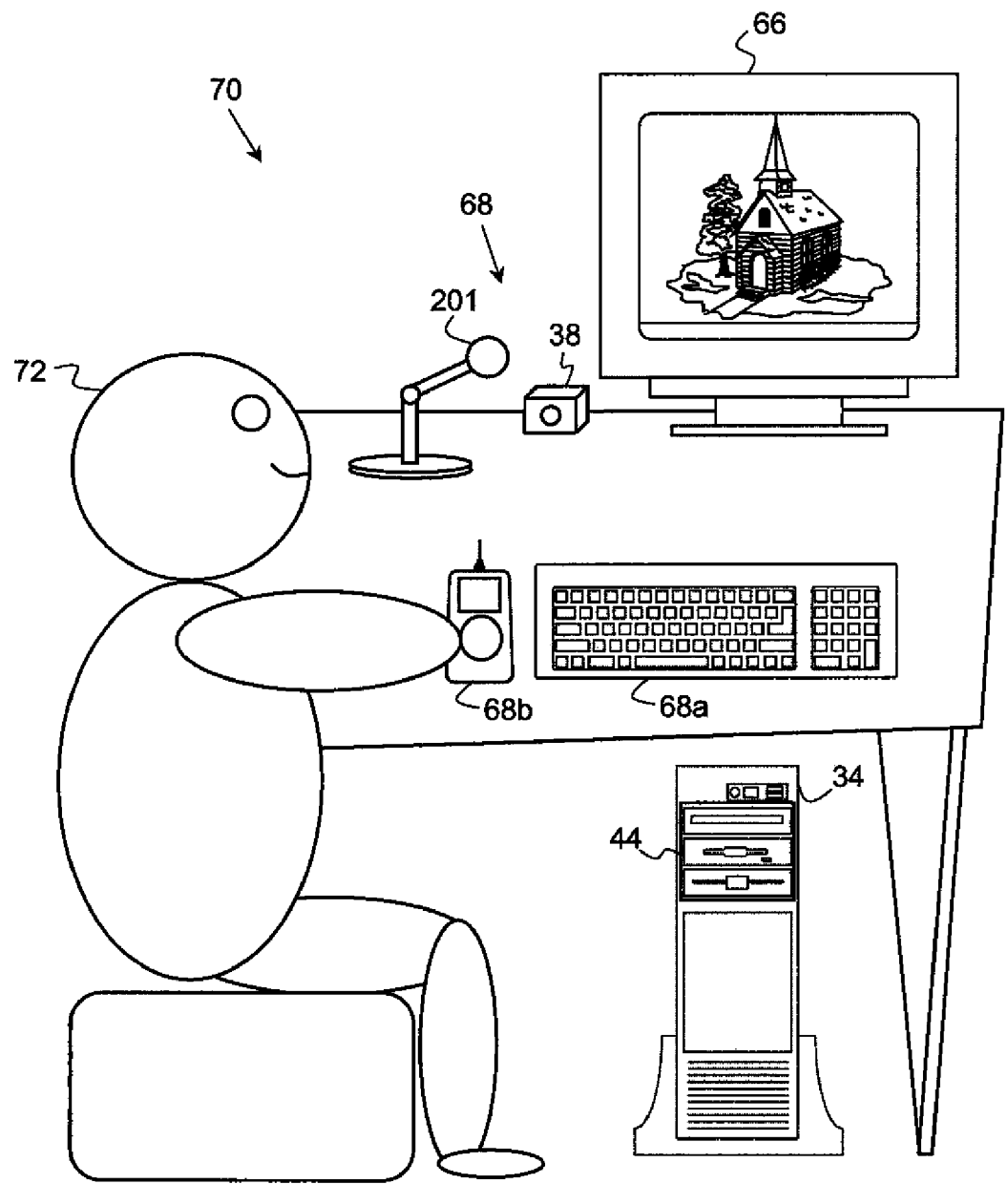
FIG. 2 illustrates a user implementing a computer system in a preferred embodiment of the present invention.

As is illustrated in FIG. 2, computer system 26 and local user input 68 can take the form of an editing studio or kiosk 70 (hereafter also referred to as an "editing area 70"), although this illustration is not intended to limit the possibilities as described in FIG. 1 of editing studio implementations. In this illustration, a user 72 is seated before a console comprising local keyboard 68a and mouse 68b and a local display 66 which is capable, for example, of displaying multimedia content. As is also illustrated in FIG. 2, editing area 70 can also have sensors 38 including, but not limited to, camera or video sensors 38, audio sensors 201 and other sensors such as, for example, multispectral sensors that can monitor user 72 during a user or production session.

Output system 28 (FIG. 1) is used for rendering images, text, completed or uncompleted digital image templates, or other graphical representations in a manner that allows an image enhanceable item to be converted into an image enhanced product or display, such as a digital frame, LCD display, photo album, or collage. In this regard, output system 28 can comprise any conventional structure or system that is known for printing, displaying, or recording images, including, but not limited to, printer 29. For example, in other embodiments, output system 28 can include a plurality of printers 29, 30, wherein processor 34 is capable of printing to a plurality of printers or a network of printers. Each printer of the plurality of printers can be of the same or a different type of printer than at least one other of the plurality of printers, and each printer can produce prints of the same or a different format from others of the plurality of printers. Printer 29 can record images on a tangible surface, such as on, for example, various standard media or on clothing such as a T-shirt, using a variety of known technologies including, but not limited to, conventional four color offset separation printing or other contact printing, silk screening, dry electrophotography such as is used in the NexPress 2100 printer sold by Eastman Kodak Company, Rochester, N.Y., USA, thermal printing technology such as in thermal printer 30, drop on demand ink jet technology and continuous inkjet technology. For the purpose of the following discussions, printers 29, 30 will be described as being of a type that generates color images. However, it will be appreciated that this is not necessary and that the claimed methods and apparatuses herein can be practiced with printers 29, 30 that prints monotone images such as black and white, grayscale or sepia toned images.

In certain embodiments, the source of content data files 24, user input system 68 and output system 28 can share components. Processor 34 operates system 26 based upon signals from user input system 58, 68, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit chip, or a series of discrete chip components.

Figure 3:
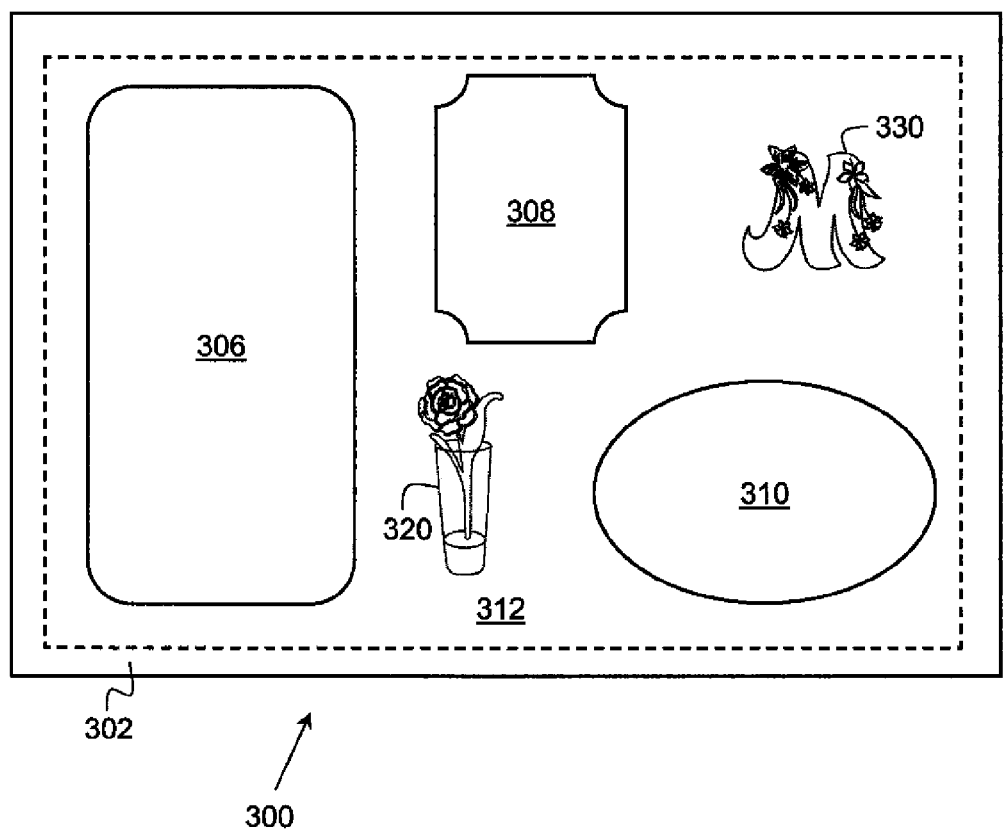
FIG. 3 illustrates a digital template design in a preferred embodiment of the present invention.

As used herein, an embodiment of an image enhanceable item 300, such as the example frame shown in FIG. 3, can include anything that has a tangible surface 302 with which an image can be formed, displayed, popped in, inserted, attached, adhered, located, embedded, placed or otherwise provided. In addition, an image enhanceable item can be extended to include non-tangible items such as holograms or other digitally controlled virtual displays. An image enhanceable item or items can be saved on various recording media for playback on digital displays, projectors, home theater systems as slideshows. For example and without limitation, an image enhanceable item 300 can be formed in various shapes such as heart shaped, a person's profile, the shape of a geological area, or any other shape. The tools and techniques for generating image templates of various shapes, in general, are well known in the art and are not described further herein as to their initial creation. It can also take the form of a collage, photo book, scrap book, photo calendar, mug, stein, cup, stemware, jewelry, tile, mosaic, home décor, mouse pads, pillowcases, pen & pencil holders, a simulated or actual brushstroke image on canvas, a photo-realistic image on a canvas, a keepsake box, a fleece blanket, coasters, frames, ornaments, round ornament, snowflake ornament, filigree ornament, pewter ornament, holiday ornament set, annual ornament set, playing cards, puzzle, teddy bear or other stuffed animal, wall paper, packaging, apparel & accessories, including, but not limited to, a T-shirt, a tie, a tote bag, apron, baby onesie, performance shirt, and/or frame, matte and image combinations and collages, mailing labels, gift tags stamps, or any other tangible item.

In addition, other embodiments of an image enhanceable item are also contemplated. Embodiments of the present invention also include electronic displays such as picture frames, digital store front displays, digital projectors, score boards such as in a stadium, or elsewhere, billboards, and interactive displays. Such displays have spatial and temporal components which are described below. The temporal component can be used to display transient information, advertising, artistic content, and can be saved for later display.

Thus, the image enhanceable item 300 as shown in FIG. 3 can be an electronic digital display, or template. In this form, the electronic "virtual" display as shown can realistically represent an actual frame available at a retail location that provides a kiosk that includes the software and/or computer system of the present invention. A user activates the kiosk to automatically generate an artistically coordinated image display, such as the "virtual" template with virtual windows or openings shown in FIG. 3 displayed on screen 66 of computer system 26, with the user's images merged therein. The user can select this virtual template image to be printed on attached printer 29. A print of this electronic virtual template display, with the user's digital images located in the electronic virtual windows therein, can then be inserted or located in the actual frame available at the retail location so that the printed images align with actual physical openings, or windows, in the frame. The "virtual" openings 306, 308, and 310 on the display can be used to display images or videos or a combination of both. The color and texture of an electronically displayed template 312 can be selected to resemble any material. In a preferred embodiment, the texture can be selected to resemble an actual tangible picture frame which a user can purchase. This allows the user to experience the actual look and feel of the frame containing his or her images placed in the windows before printing the completed template design. The user can select alternate templates to be displayed with the same images disposed therein or with a new set of images, under control of the software embodiments of the present invention being run on the computer system 26, as described previously. The display template 300 shown in FIG. 3 can be formed in any shape, such as an oval, diamond, trapezoid, or any other regular or irregular shape. The openings 306, 308, and 310 in the electronic display format can also be shaped and patterned, in any form or shape and in any number and location within the template. The template described above and any images or videos disposed therein can be displayed on an electronic display 66 coupled to the computer system 26 as described above. The background 312 of the template can include decorative background images 320, 330, or videos to enhance or complement the look and feel of the images or videos disposed in other ones of the openings. In such a format, the frame would consist of a digital picture frame circuit controlling the display in one or more of windows 306, 308, 310, and having remaining openings therein to display image prints. Thus, one or more of the windows 306, 308, 310 would be an electronic LCD or OLED display, or other display technology, and the remaining windows used for disposing printed images. Any one or more of the openings 306, 308, 310 can include single images or single videos while other openings can display changing images or videos. Such images or videos can include transitions (a still or motion image that changes over to another still or motion image, which can be the same or different from a current still or motion image) that can be separately timed or can occur simultaneously with transitioning images or videos displayed in other openings. An advantage of certain embodiments of the present invention is that various combinations of images, videos, frame designs, etc. can be displayed, under user control, in alternative forms as a virtual template on a display of computer system so that a user can select a desired look for an image enhanced product. If the electronic virtual template as shown in FIG. 3 is used as a template for display on a scoreboard at a stadium event, for example, the openings can be used to display live feeds from any number of selectable cameras situated in different locations at the stadium.

It is the intent of particular embodiments of the present invention to set forth a language, method, program, or mechanism for an artist to describe his/her aesthetic intent for each template window or template opening and for the image display overall, and for this intent to be fulfilled in an automatic manner on images in real time using a computer system such as illustrated in FIGS. 1-2. The description, program, mechanism or language for each template window opening has been referred to as a recipe, formula, or as required image attributes, which are described in more detail below. These formulas can be designed by artists, designers, celebrities, sports stars, or others; transmitted and/or loaded and stored in computer system storage 40 for repeated use by any number of users of computer system 26. The formulas for the openings can be independent of the template used. An overall template recipe comprising a number of window recipes, however, is typically designed for an overall look and feel of a template and its merged images, and can be stored a template recipe file. In a preferred embodiment, the template recipe file is named so that the aesthetic effect of the template recipe is evident to users. For example, file name "Fall Colors" can identify for a user the look and feel that will be automatically generated by selecting and activating such a template recipe on computer system 26.

As another example of the operation of an embodiment of the present invention, with a template containing two window openings, we have left and right required image attributes or left and right recipes or left and right formulas. The recipe for the opening on the left may dictate that we have a colorful non-person main subject image which fills the opening at a 120% zoom. The recipe for the opening on the right may dictate that we have a landscape image with two people; both facial poses are directed slightly to the left, each face having a 20% fill factor and both faces be offset to the left by 20%. In order to fulfill the recipes each of a plurality of computer system accessible images is evaluated, via programmed computation as described below, based on a fitness measure that calculates an image's compatibility with an opening's required image attributes, for each image with respect to satisfying the recipes for the virtual frame openings. Thus, some images might better satisfy a template opening recipe than another image as indicated by a higher score, evaluation, or compatibility calculation. The images with the highest score, automatically obtained by executing the programming, for each window opening, as against a number of stored images, is automatically chosen to fill each window opening without requiring user intervention in most instances. For most cases, the user merely needs to provide a number of digital images to the computer system, e.g. attaching a flash drive at slot 46 that contains some or all of the user's image files and, in certain, but not all, embodiments of the present invention, the user also selects a favorite image or images which is then used by the computer system as a basis to automatically select remaining images to fill out a template display and/or to automatically select a template. The user may also provide a network server location to the computer system where some or all the user's images are located. The network connected computer system will then retrieve these images for use in generating a completed image display template.

Alternatively, the scoring computation can be programmed such that an optimum arrangement of images in the window openings is one that generates an overall highest score for the entire template. An arrangement that generates the highest overall score is chosen. Identifiable or measurable characteristics that might be included to affect score calculations include, but are not limited to, identity of main subject, main subject size, number of faces, face size, facial pose, facial expression, age/gender of face, dominant color, texture analysis, object match, and time stamp. Time stamps can be effective to search for and find images captured during a particular season. These various characteristics of images are referred to herein as metadata or metadata tags, and are described in more detail below. Metadata can be recorded in association with digital images as derived (extracted) metadata, or as static (recorded) metadata. Typically, users can provide recorded metadata directly by operation of a camera or by later opening image files on a computer system and providing recorded metadata for storage at that time. Almost all digital cameras associate and store metadata with image files captured by the camera, such as time stamps, focal settings, file names, GPS location data, etc. Extracted metadata is obtained by processing image data files, either by a camera's computer system or other external hand held, or workstation, kiosk, or laptop computer system, using programmed algorithms for extracting characteristics in the image. A reference which explains computerized facial age estimation of persons in digital images is Lobo and Kwon, "Automatic Feature Detection and Age Classification of Human Faces in Digital Images", U.S. Pat. No. 5,781,650. A reference that discusses computer executed facial expression determination is described in Yin, Loi, Xiong, "Facial Expression Analysis Based on Enhanced Texture and Topographical Structure", Conference Proceedings-IEEE International Conference on Systems, Man and Cyberneteics, v1, P586-591, 2004. A reference that describes digital gender estimation is Tivive, Bouzerdoun, "A Gender Recognition System Using Shunting Inhibitory Convolutional Neural Networks", IEEE International Conference on Neural Networks-Conference Proceedings, p5336-5341, 2006. These three references are incorporated herein by reference in their entirety. "Recipes" are discussed below with respect to preferred embodiments of the present invention.

A majority of keepsake photographic memories contain pictures of people, and, as such, people are often the main subjects in images and, therefore, often may be critical in fulfilling recipe requests. Using computer methods described in U.S. Pat. No. 7,508,961B2 by Chen, Nicponski, and Ray, or P. Viola and M. Jones, "Rapid object detection using a boosted cascade of simple features," in *Computer Vision and Pattern Recognition*, 2001, *Proceedings of the* 2001 *IEEE Computer Society Conference*, 2001, pp. I-511-1-518 vol. 1, or Schnieiderman, H. Schneiderman, "Feature-centric evaluation for efficient cascaded object detection," in *Computer Vision and Pattern Recognition*, 2004. Proceedings of the 2004 *IEEE Computer Society Conference*, 2004, pp. II-29-II-36 Vol. 2, the size and location of each face can be found within each image. These three documents are incorporated by reference herein in their entirety. Viola utilizes a training set of positive face and negative non-face images. Then, simple Haar-like wavelet weak classifier features are computed on all positive and negative training images. While no single Haar-like feature can classify a region as face or non-face, groupings of many features form a strong classifier that can indeed be used to determine if a region is a face or not. This classification can work using a specific size window. This window is slid across and down all pixels in the image looking for faces. Then the window is enlarged and larger faces are scanned in the image. The process repeats until all faces of all sizes are found in the image. Because this process can be quite compute intensive, optimizations such as an integral image and cascades of weak classifiers makes the process work faster. Not only will this process find all faces in the image, it will return the size of each face. Similar techniques can be used to find the location and size of any non-deformable object such as people, cakes, balloons, graduation caps, cars, boats, and other desirable objects.

Once a face is found, neural networks, support vector machines, or similar classifying means can be trained to locate specific features such as eyes, nose, and mouth; and then corners of eyes, eye brows, chin, and edge of cheeks can be found using geometric rules based upon anthropometric constraints such as those described in DeMenthon, Daniel F, Davis, Larry S., "Model Based Pose in 25 Lines of Code", Proceedings from the Image Understanding Workshop, 1992. Active shape models as described by Cootes, T. F. Cootes, C. J. Taylor, D. H. Cooper, and J. Graham in "Active shape models—their training and application," *Computer Vision and Image Understanding*, vol. 61, pp. 38-59, 1995, can be used to localize all facial features such as eyes, nose, lips, face outline, and eyebrows. These two publications are incorporated by reference herein in their entirety. Once all features are found, it is possible to determine if eyes/mouth are open, or if the expression is happy, sad, scared, serious, neutral, or if the person has a nice smile. Determining pose uses similar extracted features. A. Savakis, M. Erhard, J. Schimmel, and J. Hnatow in "A multi-camera system for real-time pose estimation," Bellingham Wash., 2007, developed a geometric model that adhered to anthropometric constraints. This document is incorporated by reference herein in its entirety. With pose and expression information stored as metadata for each image, the present invention can give the artist more functionality to define increasingly nuanced image enhanced products by allowing the artist to specify in a window recipe, for example, a person looking to the left with a serious demeanor.

In many instances there are no people depicted in an image, but there is a main subject that is not a person or that does not contain a recognizable face. A main subject detection algorithm, such as the one described in U.S. patent application Ser. No. 09/223,860, filed Dec. 31, 1998, which is incorporated herein by reference in its entirety, can be used to search for and find an image to fill each opening in an aesthetic manner according to stored recipes. Such a recipe might require a particular object to be present in a an image which is searchable by virtue of that object being identified in the metadata associated with an image. The metadata for images in a data base of images is searched and those images whose metadata satisfies the search are found and evaluated according to programmed evaluation procedures which are typically defined as calculations to provide a compatibility index as between a found image and a template opening's required image attributes.

Other exemplary embodiments of such algorithms involve segmenting the image into a few regions of homogeneous properties such as color and texture. Region segments can be further grouped into larger regions based on similarity measures. Regions are algorithmically evaluated for their saliency using two independent yet complementary types of saliency features—structural saliency features and semantic saliency features. The structural saliency features are determined by measurable characteristics such as location, size, shape and symmetry of each region in an image. The semantic saliency features are based upon previous knowledge of known objects/regions in an image which are likely to be part of foreground (for example, statues, buildings, people) or background (for example, sky, grass), using color, brightness, and texture measurements. For example, identifying key features such as flesh, face, sky, grass, and other green vegetation by algorithmic processing are well characterized in the literature. The data for both semantic and structural types can be integrated via a Bayes net as described by Russell and Norvig, "Artificial Intelligence—A Modern Approach," $2^{nd}$ Edition, Prentice Hall, 2003, to yield the final location of the main subject. This document is incorporated by reference herein in its entirety. Such a Bayes net combines the prior semantic probability knowledge of regions, along with current structural saliency features into a statistical probability tree to compute the specific probability of an object/region being classified as main subject or background. The main subject detection algorithm provides the location of a main subject and the size of the subject as well.

Using recipes, an artist may design and store in the computer system memory creative required image attributes for a number of template openings defining an image template recipe, thereby creating several aesthetic or practical looks for a single image enhanced item. A retail store that provides the tools described herein for customer use and purchase can choose to roll out new looks for each season, holiday, or other occasions. A store that provides these product services can license recipes to or from famous artists or celebrities. An aesthetic look can also be achieved by programmed computer system analysis of a user's images or from a user's selection of a primary or favorite image or images, determining a theme or pre-determined look from image to image, and then picking a template that is complementary to that theme or look. A preferred embodiment of the present invention contemplates an initial step of characterizing images in order to select a template based on those characterizations, and also contemplates an initial selection of a template in order to identify appropriate images for inclusion. In each case, recorded image metadata is used, or is generated by extraction and stored with the images, and is compared with metadata stored with an image template to evaluate, via an evaluation procedure, compatibility between them. A preferred embodiment of the present invention extracts characteristics of a user's designated favorite image or images and incorporates those characteristics in window recipes for remaining openings in a template.

Another embodiment of the present invention includes computer system analysis of digital images for information content such as number of people and/or their expressions and/or color content, then the images are computationally evaluated against selected aesthetic intents as defined by a template or window recipe, where such artistic or aesthetic intents include specific design layouts, each layout being created in advance by an artist or someone skilled in the art of making an image layout pleasing or enticing. For a tangible consumer product, such as a collage, frame, or photo book, the intent may include making something pleasing, creative, fun, inspirational, romantic, or to invoke past memories. For transient displays, such as the electronic displays described above, the intent can be the same as for image enhanceable consumer products, such as digital picture frames or cameras, but may be quite different for commercial applications using electronic displays of various sizes. The following are examples of commercial applications: a digital storefront may be continually updating its product line in an attractive and enticing manner, an embodiment of the present invention may include a large or small digital display in a storefront window. An alternative embodiment may include a user interactive display. A news billboard intent may be to group images by subject and relevance. A sports venue billboard or scoreboard may include displaying pictures that work well together gathered from a continual scanning and capturing of images of the attending crowd or other scenes in or near the sports venue. An interactive display can have a mix of live video frames and pre-existing digital libraries and update its content based upon user input, where the user input can be received via a traditional mouse and keyboard, or may be haptic interfaces, or the display may update its content automatically by detecting a user's facial expression and user activity, and selecting those kinds and types of images for display that elicit a particular electronically detected response. The aesthetic intent that scores highest, or works best for that particular image set is chosen automatically for display or inclusion in an image enhanceable product. Scoring is symmetric in that a template can be selected in advance and the highest scoring images are included, or one or more images can be selected in advance, and then the highest scoring template is selected based on its aesthetic compatibility with the selected images. Alternatively, when creating image enhanceable consumer products, the top n highest scoring images/templates/recipes can be presented to the customer on a computer system display, who in turn picks the image/template/recipe of his/her choice and communicates such a choice to the computer system via the user input controls.

Given an aesthetic look defined by a recipe, filling each window in an image enhanceable item can be done in at least two ways. If there are n windows and n images, a preferred embodiment of the method of the present invention can include computing all possible combinations of all images contained in an image data base in each window. If there are n windows in a virtual image template and m images in an image database, where m>n, a preferred embodiment of the present invention could have many variations to score. In the latter condition, a preferred embodiment of the invention is to place the image with the highest score into each window. In this example, each image is scored by programmed computation against each window recipe individually, and the image with the highest compatibility score for a particular window gets assigned or selected to that particular window. If an image is calculated to have a highest score that is identical in greater than one window, the window with the higher weight is considered more important and will be used to display the high scoring image. Template window weighting is described in more detail below where priority of template windows correspond to the numbering of the windows in a template. If multiple images are scored equivalently for a single window opening, metadata fields that record the number of times an image was accessed can be used to break a tie. To resolve ties, an algorithm that randomly selects an image from the group can be used. The use of weighted values for images and for template openings is described in more detail below.

Another common template recipe generation and fulfillment technique is image splitting. Image splitting is the process of taking a single customer image, and spanning that one image over 2 or more window openings. For example, the program can receive as input a single picture of a bride and groom. An application of a particular recipe will result in the bride being placed in the left window with the groom in the right window. An artist will be able to define and store recipe requirements for the size, location, and spacing of two people in a single photograph. The customer images in a product order can be analyzed using the aforementioned methods. An image with a highest score can be chosen to fulfill the product intent. If no images score above a defined threshold, the algorithm can be designed so that a different recipe is automatically chosen and the process repeats itself with the new recipe.

Often, when doing image splitting, it is necessary to know not only where the main subject is, but also to know the detail surrounding the main subject. For example, the artist may define and store a recipe requiring that a template with three window openings have a main subject face in a larger left window and low color non-face and non-main subject in the two smaller windows to the right. Image segmentation algorithms provided on the computer system along with people or main subject detection algorithms are oftentimes adequate to fulfill aesthetic image splitting requirements depending upon the artist's template recipe. A more advanced splitting technique uses seam carving as described by A. Shai, S. Ariel in "Seam Carving for Content-Aware Image Resizing", *ACM Transactions on Graphics*, Vol. 26, Issue 3, July 2007, to determine low energy regions of the image. This document is incorporated by reference herein in its entirety. These low energy regions are ideal candidates for splitting and can significantly aid the creative designer to define template recipes for attractive coordinated image displays.

Stored template recipe files created in advance by an artist can apply to the overall image enhanceable item 300, as well as for each window opening within the item. Each window recipe file can be combined and stored with other window recipe files to generate a stored template recipe file. These recipes can be designed and executed on the computer system for determining parameters such as, but not limited to, landscape vs. portrait orientation, colorfulness, sepia, color tint, person, face, main subject, size of person/face/main subject, location of person/face/main subject, surrounding regions of person/face/main subject.

In a preferred embodiment of the present invention, in order to size objects correctly, a relative measurement algorithm is used. This programmed system can specify size and location of an object in an image via a variable measure called a unit. A unit can be defined as the width or height of a face, the width or height of a main subject, or the width or height of an object in the image. A window recipe file can specify requirements to fill a window with a single person, that a face is 20% fill; where face location is specified as two unit spacings from a left edge, one unit spacing from a top edge; where there is low texture in the area of the image including two units of spacing to the right of the face or main subject; where the colorfulness of the person's shirt/blouse/dress (at 2 units below face) is high. The capability to specify and store in the computer system these required image attributes as window recipes for later repeatable use provides extensive creative flexibility for an artist.

In another preferred embodiment of the present invention, images can be scored on a merit system. The image that scores highest for a particular window recipe is indicated as assigned to the corresponding window. This can be programmed to occur automatically upon activating an application on the computer system, provided that there is a number of computer accessible images available, with no user interaction. This frees the user from the laborious and time consuming task of looking through many image files and is able to automatically create an image enhanceable item 300 that is often much superior to what a lay user could create because the designed look was created by a skilled artist. Of course, if the user is not happy with the automatic selection of templates and images, he/she can manually override the system, by selecting a user control option provided by the program, and either rescale, replace, re-crop, re-enhance, or modify an image using various off-the-shelf software products for digital image editing, or designate a different image from his or her collection of images for a particular virtual template window opening.

An exemplary recipe for a window, which can be one of a plurality of windows in an image template, is illustrated by the following code segment:

```
<MetaDatum Label="EastmanKodakCompany"
Tag="Orientation" Datum="1" />
    <MetaDatum Label=" EastmanKodakCompany "
Tag="OrientationWeight" Datum="20" />
    <MetaDatum Label=" EastmanKodakCompany "
Tag="FacialCloseToNum" Datum="3" />
```

-continued

```
    <MetaDatum Label=" EastmanKodakCompany "
Tag=" FacialCloseToNumWeight" Datum="10" />
    <MetaDatum Label=" EastmanKodakCompany "
Tag="Favorite" Datum="1" />
    <MetaDatum Label=" EastmanKodakCompany "
Tag="FavoriteWeight" Datum="10" />
    <MetaDatum Label=" EastmanKodakCompany "
Tag="Resolution" Datum="2431800" />
    <MetaDatum Label=" EastmanKodakCompany "
Tag="ResolutionWeight" Datum="100" />
    <MetaDatum Label=" EastmanKodakCompany "
Tag="OffsetLeft" Datum="1" />
```

In the above recipe, each required image attribute entry is delineated by brackets and, where appropriate, is followed by an entry defining its weighting factor. In the first line, Orientation is the image required attribute, and the value paired up with Orientation key is the value 1, which in this example represents landscape orientation ("0" indicates a portrait orientation). Thus, landscape images will receive an attribute score of 1, portrait images a score of 0. For this example and the others that follow below, the ordering of the entries is arbitrary. The weighting factor is used for scoring images as is explained below.

The FacialCloseToNum required image attribute indicates that the input image should contain close to three faces according to its value. An image with exactly three faces would receive a score of 1. Images with 2 or 4 images receive a score of 0.5, images with 1 or 5 images receive a score of 0.25, images with zero faces receive a score of 0, images with 6 images receive a score of 0.125, images with 7 or more images receive a score that can be calculated by score=$1/(2^{\wedge}(ActualFaces-DesiredFaces))$, where DesiredFaces is the Datum value of 3 in the FacialCloseToNum attribute line. Similar attribute tags can be programmed, using any range of assigned values or by applying various value formulas, for FacialNumExact (an exact number of faces in an image), FacialGreaterThanEqualToNum (for a minimum number of faces in an image), and FacialLessThanEqualToNum (for a maximum number of faces in an image).

The Favorite tag defines whether the required image attribute indicates using one or more of a user's designated favorite image or images. Favorite images will get a value of 1, non-favorite images will get a value of 0. Of course, other value assignment strategies can be programmed into any window or template recipe.

The resolution tag defines a resolution based on pixels required for the image in the corresponding window. In this case, the image is required to have an image attribute resolution of 2431800 pixels (computed as (width in pixels)×(height in pixels)) or higher to obtain the resolution weight added to its overall score. Images with total number of pixels>=the Datum attribute receive a value of 1, all other images receive a value of 0.

The weighting factor as used for required image attributes enables the artist to specify a different level of importance for each required image attribute when determining the image's overall score. The weighting factor multiplied by the image attribute score generates a weighted score for each attribute. The sum of all weighted scores gives a total score for each image evaluated by this computation method. Clearly, various procedures for determining compatibility of images with required attributes can be devised and easily programmed for use with this embodiment of the invention. The image with the highest total score is the image that most satisfies, or is most compatible, with the window recipe. In a preferred embodiment of the present invention, if a weight line is omitted for a particular attribute, the default weight of 10 is automatically assigned. Attributes which are more important have weights greater than 10, and attributes which are less important have weights less than 10. If an attribute is mandatory, a weight of 100 (or higher) is assigned. As used herein to modify the term "attribute(s)", the terms "required" and "requirements", etc., are variable requirements according to the weights ascribed to any particular attribute. Thus, an attribute rises to the level of "mandatory" if its weight is programmed with a value of 100. For example, in the above code segment, the ResolutionWeight is equal to 100. This means that only images with 2431800 pixels or higher can be used in this window opening.

All entries, except the last one in the above example recipe segment, are used for scoring candidate images. The last entry, in this example it's "OffsetLeft", is used as a template/window specification, and not as an image selection guideline, and thus the last line does not have a paired weight line. The last entry specifies that the highest scoring image, or the image selected for a virtual template opening, should be modified in some respect. This can be referred to as a "post processing" step because it is used as a fine tuning step or as a post-selection layout step. In this example the specification states that the main subject be shifted left using the rule of thirds before virtual placement into the template opening. The rule of thirds is a photographic composition rule that has proven to yield well balanced or natural looking prints by the average observer, and can be programmed for use by computer system 26. If an image is broken into an equally spaced 3x3 grid with two horizontal and two vertical lines, the aesthetic design idea is to move or place the image such that the subject of interest is located on one of the four dividing lines. Similar rule of thirds tag entries include "OffsetRight", "OffsetTop", "OffsetBottom", "OffsetUL", "OffsetUR", "OffsetLL", and "OffsetLR" to place (or move) the image such that the main subject is located on one of the four rule of thirds lines or, as in the last four examples above, on one of the four intersecting points of these lines. Other template specification tag entries, for post-selection layout, exist to modify a specific main subject/face size and location, or overall image rendition, such as "sepia", "B/W", "colorful", "light", "high Contrast", "soft", "cartoonization", "emboss", and other artistic or aesthetic effects.

In another preferred embodiment of the present invention, favorite or primary images can be designated as such in an images recorded metadata and used as either the focal point of the image enhanceable product, can be tagged for special or unique treatment either at pre- or post-selection, or can be used as a primary template image such that images in other template windows must conform, as defined in their associated required image attributes, in some aspect to key characteristics of one or more image attributes of favorite or primary images. For example, a large window opening in the center of a template might be appropriate to place one of the customer's primary images. Such an opening can be designated as a primary opening in a template and its required image attributes can be defined such that it will receive an image designated as primary or favorite. A user of the computer system can be programmably prompted to identify such images during operation of computer system 26 or such images might have a "primary" indication already stored in association with the image as a recorded metadata tag. Other template openings can also be designated as primary, or as secondary, etc., and image files can include metadata information indicating which ones are favorite or primary images so that the programmed computer system can search and find these images for placement into the designated template window. As mentioned earlier, a customer can designate an image as a primary or favorite image, can dictate the location of their favorite image within one of a number of template windows, or may tag many images as favorites, letting the program automatically pick from a selection of favorite images using other image attributes as selection criteria based on required image attributes defined in template or window recipes. Other images in neighboring template openings can then be automatically selected by computer programming according to window recipes stored in association therewith. Other features of window recipes can include detected similar color and tone characteristics, or other stored image aspects, of the particular favorite image or images.

For the example recipe defined by the program segment above, an image would be required to have the following image attributes: it would have to be designated as a favorite image, be laid out in landscape mode, be a group shot, optimally with 3 people in it, and needs to have a resolution of 2431800 pixels or higher to obtain the perfect total score of 40 in this example (the resolution weight of "100" is not an actual weight because the number "100" triggers a special case handling in the program that the resolution weight is mandatory, and not just a relative level of a requirement). The total score is obtained by evaluating each attribute independently, then summing together each image's weighted values. Also in this recipe example, as dictated by the attribute weights, aspect ratio, with a weight of 20 is more important to the artist than most of the other scoring attributes which each have a weight of 10.

The above required image attribute values and weights (in XML these are referred to as key value pairs) are designed by the artist and are stored in computer storage or memory 40 as definition files for each template opening (i.e. "window recipe") as a method to realize the artist's aesthetic intent. In addition to defining attributes on a window by window basis, openings can be referenced by a group name, or template name, where all window openings in a named group, or template, have at least one common attribute (i.e. "template recipe"). In addition, a grouping of all openings in a template can be programmed for enabling global required image attributes, where such attributes are required for all openings in the template. A precedence procedure can also be programmably defined, for example: required image attributes for a group of openings supersede global required image attributes, and individual opening required image attributes supersede group attributes. For example, the artist may define a global required image attribute requiring that all openings must contain people by specifying under the global recipe:

```
<MetaDatum Label=" EastmanKodakCompany "
Tag="FacialGreaterThanEqualToNum" Datum="1" />
<MetaDatum Label=" EastmanKodakCompany "
Tag="FacialGreaterThanEqualToNumWeight"
Datum="100" />
```

By weighting such an attribute with a value of 100, it becomes mandatory. Therefore, if there are no satisfactory images found after performing an automatic programmed search through available image data bases the program may notify the user that it can't be fulfilled. In the above global attribute example, if a weight were not explicitly specified, a default weight of 10 is automatically assigned in a preferred embodiment. Subsequent examples herein will not specify weight values for purposes of simplicity of description.

In another preferred embodiment, a window recipe might define required image attributes such that each window includes an image having a particular time-date stamp, GPS location, camera parameters, or other user definable tags. For example, a window recipe can include any combination of the following example required image attributes:

```
<MetaDatum Label=" EastmanKodakCompany "
    Tag="DateMin" Datum="10/20/2008" />
<MetaDatum Label=" EastmanKodakCompany "
    Tag="TimeMax" Datum="21:00" />
<MetaDatum Label=" EastmanKodakCompany "
    Tag="Date" Datum="10/20/2008" />
<MetaDatum Label=" EastmanKodakCompany " Tag="GPS"
    Datum="(44.613934, -110.558167)" />
<MetaDatum Label=" EastmanKodakCompany "
    Tag="GPSRadius"   Datum="75.5m" />
<MetaDatum Label=" EastmanKodakCompany " Tag="ISO"
    Datum="400" />
<MetaDatum Label=" EastmanKodakCompany "
    Tag="Title"   Datum="Disney" />
```

The first two examples above define the minimum and maximum date and time of capture of the image. DateMax and TimeMin similarly exist. In the above example for DateMin, the full month/day/year is specified. This format can be changed to any of a number of accepted formats like day/month/year. It is also acceptable to include partial dates. If the day of the month is to be omitted, the above Datum would be "10//2008". The third example shows an example of specifying an exact date. A similar field exists for Time. In addition to specifying an exact date as above, well known holidays can be substituted, such as Datum="Thanksgiving", or Datum="Memorial Day". Similar substitutions of "Noon" and "Midnight" can be used for the time entry. The fourth and fifth examples require the image to be captured at a particular GPS location, such as a campground near a particular tourist attraction (within 75.5 meters in this example) in Yellowstone National Park; the fifth example allows control over the camera's image capture conditions such as ISO, and can be used to specify more advanced features such as focus distance, F#, etc. The final example can be used to require images with particular customer or third party provided metadata tags. In this example, recorded metadata associated with an image is required to include the text "Disney". For another example, it is possible for a user to specify for a window recipe only shots of "Uncle Joe", or for a Kiosk application to require looking for images on a particular website that are metadata tagged for specific usage on a particular template or a particular family of templates. For example, the program can be designed to look for images tagged with "Uncle Joe" on the user's or users friend's Facebook account, and such an account on a computer system accessible web server can automatically be searched and images having the required metadata retrieved; or images from Flickr that are tagged as "sunset" can be required in a window recipe; or custom databases can be created locally on the computer system or on a coupled computer system in a distributed network, or on network accessible servers with the intention of combining images stored in them into user enhanceable products.

Public or private image databases may have tagged images with specific content available for usage in the user enhanceable product 300. This content may be generic such as "beach", "palm trees", or may have a unique identifier with a product label such as "Kodak Premium", or may be authorized by and associated with a particular celebrity such as a "Famous Designer", or may be part of a special store promotion such as "Walmart Summer 2008". More than one Title recipe entry can exist to tag a window opening, for example "Famous Designer Fall 2008 Collection" or "Colorful Leaves" is required to appear together with "Disney". The usage of such template recipes can be used to entice consumers to purchase the latest celebrity branded and celebrity approved image enhanceable item 300 and may include the automatic diversion of royalties to said entity and entice the return of customers time and time again to purchase the latest offering by a specific celebrity/artist/sports/famous person or event such as a World Series 2009 collection.

Once again, the programming of global recipes and local recipes for each window can be used to generate recipes for templates of various types. For example, when creating a picture book, it is often desirable, but not mandatory, to arrange pictures in chronological order. We can create global recipe for a picture book template to "softly" enforce such rules for each window in the virtual picture book template, as shown below, by assigning a lower weight values for "soft" enforcement:

```
<MetaDatum Label=" EastmanKodakCompany "
    Tag="Date" Datum="W1>=W0" />
```

In the above example, the recipe requires that W1 (window 1) should have a date (or time stamp) that is greater than or equal to W0 (window 0), a greater time stamp meaning later in time, where W1 and W0 are more generally described as W<integer>, where integer is any window opening ID. By modifying the assigned weight of the above recipe, we can enforce more or less the desire to maintain a chronological ordering of customer images in a picture book as compared to other image attributes. To force chronological ordering as a mandatory entry, the weights would be set to 100 for this entry for each window opening.

In another preferred embodiment of the present invention, the window recipe might include color intent such that each window opening in a template has a defined stored color intent. For example, a recipe can control color content as follows:

```
<MetaDatum Label=" EastmanKodakCompany "
    Tag="ColorIntent" Datum="Cool" />
<MetaDatum Label=" EastmanKodakCompany "
    Tag="ColorIntent" Datum="Cyan" />
<MetaDatum Label=" EastmanKodakCompany "
    Tag="ColorIntent" Datum="150,220,75" />
<MetaDatum Label=" EastmanKodakCompany "
    Tag="ColorIntent" Datum="W0" />
```

The first entry defines the required color attribute via values such as "warm" and "cool" for the image; the second entry defines the allowable color attributes via specific color values as "red", "green", "blue"; the third example defines the allowable color attributes via specific 24-bit RGB code values to define required image attributes with a specific color value to match, for example, a company logo, pantone color, or other pre-defined color scheme. The final line is the most complex: if the attribute value (Datum) is a W<integer>, this indicates that the primary color from an image disposed in window opening <integer> is first to be extracted, and then the current window opening is defined to require image attributes to have primary colors similar to, or dependent upon, that of the image in window <integer>.

In the previous examples, images that have attributes as defined in the required image attributes score higher than those that do not. After the best image is selected, the image is further modified to accommodate the window recipe command. So, for the last example, if W0 had a warm primary color, the image that matches this warm color the closest gets the highest weight. Upon final selection of an image, the image selected for this window opening is further checked and modified, i.e. colors are modified to warm properties, if necessary, to obtain this same warm primary color from window W0.

In another preferred embodiment embodiment of the present invention, the window recipe might include tonescale intent such that images in each window opening in a template has a predetermined tonescale. For example, each recipe entry line can control tonescale in any of the following ways:

```
<MetaDatum Label=" EastmanKodakCompany "
Tag="ToneIntent" Datum="Light" />
<MetaDatum Label=" EastmanKodakCompany "
Tag="ToneIntent" Datum="Low" />
<MetaDatum Label=" EastmanKodakCompany "
Tag="ToneIntent" Datum="W0" />
<MetaDatum Label=" EastmanKodakCompany "
Tag="ToneIntent" Datum="~W0" />
<MetaDatum Label=" EastmanKodakCompany "
Tag="ToneIntent" Datum="W0|W1" />
<MetaDatum Label=" EastmanKodakCompany "
Tag="ToneIntent" Datum="~(W0|W1)" />
```

The first example controls the allowable image scene contrast attributes via values such as "light" and "dark"; the second example controls the allowable image contrast intent via specific attribute values such as 'high, "low", or "normal". The next example is similar to the color intent. If the required image attribute value is defined as W<integer>, this indicates that the primary tonescale characteristics from an image in window opening <integer> is first to be extracted, and then the required image attributes for an image in a current window is chosen to have a tonescale similar to, or dependent upon, that of an image in window <integer>. This feature can be used in conjunction with or independently from the designation of a favorite image, where the color/tone information is extracted from the favorite image and used in other window openings to define required image attributes. This is a powerful program extension, for example, that would allow, for example, the color and tone of all images in a template to match a certain reference image. The certain reference image might or might not be included in the template. The reference image might be of a paint swatch, fabric, or an image of a room or any other item.

This recipe type can also be used in other commercial applications. For example, a window recipe can be created for a school yearbook whereby each graduate picture is a window having defined required image attributes associated therewith, and the color and tone of each picture be made to match, or be compatible with, a reference image. Similar applications exist for advertising. A mail order catalog or weekly store circular can use window recipes to describe page layouts such that all or a group of images have similar contrast. A programmable storefront display can be advantaged with similar required image attribute designs.

In the third example, if the required attribute value is ~W<integer>, this indicates that the primary color/tone characteristics from an image in window opening <integer> is first to be extracted, and then the current window opening is chosen to include am image having a color/tone opposite to that of the image in window <integer>. So, if the window <integer> image is high contrast, the current window opening will have an image with low contrast. Accordingly, the higher the contrast in window <integer> image, the lower the contrast in the current window image.

If the attribute value is (W<integer1>|W<integer2>| . . . |W<integern>), this indicates that the primary color/tone characteristics from images in windows <integer1> . . . <integern> are first to be extracted, and then the required image characteristics in the current window opening is chosen to have a color/tone similar to the average of the images in the n window openings. Similarly, if attribute tag value is ~(W<integer1>|W<integer2>| . . . |W<integern>), this indicates that the primary color/tone characteristics from images in window openings <integer1> . . . <integern> are first to be extracted, and then the current window opening is chosen to have an image with color/tone opposite to the average of the n window openings.

Using the color and tonescale required image attribute values, the artist can design all window openings to have similar color/tone content, unique color/tone content, or some combination thereof. It should be readily understandable that these two examples can be modified to include other required image attributes such as texture, colorfulness, season, time of year, time of day, people, sharpness, and noise.

In situations where a customer manually adjusts the color/tone/sharpness/cropping of an image in a window opening via the user control option that affects the color/tone/sharpness/cropping of another window in the project whose required image attributes are dependent upon such characteristics of the image, the dependent image can be programmed to be automatically adjusted accordingly. For example, if window opening W5 is defined to have an image with identical contrast as the image in W1, and the user then manually adjusts the contrast of the image in W1, making it higher, the contrast of the image in window opening W5 will also increase automatically according to the program. In some situations, the user may choose not to activate this feature, so the user control option can be configured accordingly.

In another preferred embodiment of the present invention, the window recipe might include further object detection or scene reflection required attributes. For example, the window recipe can dictate more specific requirements for each window opening:

```
<MetaDatum Label=" EastmanKodakCompany "
Tag="Object" Datum="Balloon" />
<MetaDatum Label=" EastmanKodakCompany "
Tag="Theme" Datum="Fall" />
<MetaDatum Label=" EastmanKodakCompany "
Tag="Similar" Datum="W1" />
```

The first example controls whether the window opening should have a specific object in the scene (a balloon), and can also specify other objects such as "BirthdayCake", "SoccerBall", or "Dog". The second example controls a required attribute defining a theme for the opening with a value such as "city", "colorful", or "dreamy". The former example can be used to search for and select all images from a soccer game or a birthday party. The latter example can be used to define a proper mood for a particular window opening. The last line utilizes a similarity measure between images. It defines the image in the current opening to be similar to that of Window opening 1. This feature supports the '~' attribute which indicates "dissimilarity" in images, and the '|' feature which indicates averaging several windows together. The similarity measure can use any number of image attributes, but RGB histogram statistics such as Chi-squared analysis or low resolution pixel correlation metrics can also be used, are fast, and perform quite well. Two low resolution metrics that perform well are Mahalanobis distance and edge map correlation. The Mahalanobis distance is similar to standard deviation, but also takes into consideration the correlation between each of the individual color channels. The edge map correlation is performed on low resolution images (64×96 pixels or smaller) by comparing the derivative (using Sobel filter) of the reference image to the derivative of all other images. More complex similarity metrics which utilize complex semantic information can be readily incorporated.

In another preferred embodiment of the present invention, the recipe can include further object, and scene attributes, such as in the following examples:

```
<MetaDatum Label=" EastmanKodakCompany "
Tag="Location" Datum="Beach" />
<MetaDatum Label=" EastmanKodakCompany "
Tag="SceneContains" Datum="Snow" />
```

The top example controls the ability to specify a generic location required attribute value such as "water", "beach", "city", or "indoors". These locations are overall scene classifications, and the resulting classification is based on an output from a scene classifying computation carried out on a digital image. The last example can further constrain the image selection procedure by requiring that scenes in an image contain certain objects or characteristics such as "snow", "water", "sky", "foliage", "dirt", and "skin". The latter example can be implemented via belief maps. If no snow is found in an image, a value of 0 is returned as that image's attribute value for "snow". The more snow found (the greater the percentage of snow pixels), the higher is its corresponding value for the required "snow" attribute in the window recipe. A discussion of sky detection is provided in Gallagher, et al., "Detection of Sky in Digital Color Images", U.S. Pat. No. 7,336,819 and an example of foliage detection is provided in "Color Segmentation as an Aid to White Balancing for Digital Still Cameras", by Cooper, Proceedings of SPIE, v4300, p164-171, 2001. Both of these references are incorporated herein by reference in their entirety.

In another preferred embodiment of the present invention, the recipe can include further people attributes, such as in the following examples:

```
<MetaDatum Label=" EastmanKodakCompany "
Tag="AgeLessThanEqualtoNum" Datum="2" />
<MetaDatum Label=" EastmanKodakCompany "
Tag="FacialPose" Datum="Left" />
<MetaDatum Label=" EastmanKodakCompany "
Tag="FacialEpression" Datum="Angry" />
<MetaDatum Label=" EastmanKodakCompany "
Tag="EyesOpen" Datum="1" />
```

The first example attribute requires that the age of people depicted in the image be less than or equal to a certain number, in this example less than or equal to two years old. Similar attribute requirements exist for AgeGreaterThanEqualtoNum, and AgeClosetoNum. Often we want people facing "forward", but, it is often desirable for a person or persons pictured in one window to be looking in the direction of a second window opening. The second example requires a particular facial pose of people or a person depicted in the image, in this example the person should be looking left. The next example above indicates a preference for a facial expression or demeanor. This allows control over facial expressions such as "angry", "sad", "surprised", "happy", "smile", and "neutral". The last example can be used to make sure the eyes of all found faces are open. Similar tags can be written to control related features such as ethnicity, gender, hair color/style, eye color, skin tone, height, age, facial or hair accessories (sunglasses, headband), facial hair, and mouth open/closed. These controls are well known algorithms familiar to persons of skill in the art, and are similar to those previously disclosed.

The next example utilizes facial recognition to identify a person in an image.

```
<MetaDatum Label=" EastmanKodakCompany "
Tag="PersonID" Datum="Uncle Joe" />
<MetaDatum Label=" EastmanKodakCompany "
Tag="PersonID" Datum="W0" />
```

In the first example, the required personID attribute controls which person's image is being inserted into an opening. The attribute value "Uncle Joe" can be satisfied either by searching for and finding recorded metadata associated with the image, or by utilizing an accompanying facial recognition database and extracting the metadata. It is well known that extracted metadata can thereafter be recorded with the image and need not be obtained by repeating the extraction processing later. Many cameras and imaging software packages now include facial recognition capabilities. The last example above utilizes the window relationship feature for window recipes. This last example says that the image being placed into the current opening must have a person, and that person must also be in window W0. This last example is a generic way of describing a relationship of people appearing in more than one template window. For example, we can have a center template window contain a closeup of a single person as dictated by a favorite image being placed therein, and all surrounding template windows may thereby be defined to require that same person somewhere in the image.

In another preferred embodiment of the present invention, the recipe can include further image selection steps, such as in the following examples:

```
<MetaDatum Label=" EastmanKodakCompany "
Tag="AspectRatio" Datum="1.5" />
<MetaDatum Label=" EastmanKodakCompany "
Tag="WindowShape" Datum="Oval" />
```

The first example attribute defines the window opening width over height aspect ratio. In this case, we know the width is 1.5 times the height. When used together with the second example, defining an oval, we can define a maskable area to overlay on top of any candidate images. We then use the maskable area to score each of the candidate images. WindowShapes can include Rectangle, Circles, Ovals, Pentagrams, Hexagons, RoundedCornerRectangles, and can be easily extended to any other shape. When AspectRatio and WindowShape are used in combination with other recipe items such as PersonID, FacesClose2Num, etc., only the maskable area is included in the overall score. For example, a 1.5 aspect ratio rectangle may include 5 faces, while a 1.5 aspect ratio oval may only include 3 faces and would result in different scores for the same underlying image.

In another preferred embodiment of the present invention, the recipe can include multiple image selections per window opening. This is defined as having two or more recipe entries for each window. In the case of overlap, the last recipe entry is the top entry unless the Order entry is used. For example, we may have the following two examples for a single window opening:

```
<MetaDatum Label=" EastmanKodakCompany "
Tag="AspectRatio" Datum="0.5" />
<MetaDatum Label =" EastmanKodakCompany "
Tag="WindowShape" Datum="Oval" />
<MetaDatum Label=" EastmanKodakCompany "
Tag="PersonID" Datum="Uncle Joe" />
<MetaDatum Label=" EastmanKodakCompany "
Tag="PersonID" Datum="Aunt Suzie" />
<MetaDatum Label=" EastmanKodakCompany "
Tag="FacialEqualToNum" Datum="2" />
```

Along with the following second recipe for the same window opening:

```
<MetaDatum Label =" EastmanKodakCompany "
Tag="AspectRatio" Datum="0.5" />
<MetaDatum Label=" EastmanKodakCompany "
Tag="WindowShape" Datum="InverseOval" />
<MetaDatum Label=" EastmanKodakCompany "
Tag="FacialEqualToNum" Datum="0" />
<MetaDatum Label=" EastmanKodakCompany "
Tag="Location" Datum="Sand" />
```

The first recipe specifies an oval mask, half as wide as tall. We want exactly two people, Uncle Joe and Aunt Suzie. The second recipe also specifies an oval mask, half as wide as tall, but, it is an inverse mask. So, the image area outside of the oval is used for image scoring. In this case, the second image outer mask area image should have no people and contain sand.

The above two examples assume the image is centered and fills the window opening as much as possible. It is possible to do various collage type entries for each opening, by specifying the subwindow [X,Y] offset and the subwindow width and height for each of the recipes that fulfill a particular opening.

```
<MetaDatum Label=" EastmanKodakCompany "
Tag="SubWindowX" Datum="0" />
<MetaDatum Label=" EastmanKodakCompany " Tag="
SubWindowY" Datum="0.5" />
<MetaDatum Label=" EastmanKodakCompany "
Tag="SubWindowW" Datum="1" />
<MetaDatum Label=" EastmanKodakCompany "
Tag="SubWindowH" Datum="0.5" />
```

In the above example, the image that scores highest for this particular recipe will be fit to the lower half of the window opening. Values for SubWindowX, SubWindowY, SubWindowW, and SubWindowH scale between 0 to 1.0, where (0,0) is the upper left corner and (1,1) is the lower right corner, but other conventions can be used. Finally, these subwindows can be feathered into one another and order can be assigned as follows:

```
<MetaDatum Label=" EastmanKodakCompany "
Tag="Feather" Datum="0.1" />
<MetaDatum Label=" EastmanKodakCompany " Tag="
Order" Datum="0.75" />
```

In the above example, feather command controls the feathered edges on an image. The convention used here is that the feather value can be any percentage of the window opening width. The Order value assigned a floating point hierarchy to each image in a window opening, where higher values move the window further to the front. If no Order value is specifically stated, or if we have two identical Order entries, it is assumed the order of the current recipe is in front of the previously found recipe for the same window opening. If the first recipe per window opening does not have an Order value, a default of 0 is used, which means it will be in the back, and all other images will be placed in front of it. Using masks, inverse, masks, locations, and order enable a powerful scripting language for the skilled artist.

In another preferred embodiment of the present invention, the recipe can include the demarcation of specific regions of the image. In particular, region segmentation of sky, snow, skin, foliage is often determined by color and location within the image. Background areas are often denoted by lack of texture. These regions can automatically be masked off and combined or replaced with other attribute areas:

```
<MetaDatum Label=" EastmanKodakCompany "
Tag="SelectSkyInverse" Datum="0" />
<MetaDatum Label=" EastmanKodakCompany "
Tag="SelectFace" Datum="50" />
<MetaDatum Label=" EastmanKodakCompany "
Tag="BackgroundColor" Datum="W0" />
```

The first example can be used to set the transparency of the non-sky region of the selected image to 0%, or set the transparency of the sky to 100%. The Datum value indicates the transparency value. When this image is overlaid on top of a previously fulfilled recipe for the same window opening, the sky will be replaced with the image contents of the background image. When the Select tags are used, all areas not included are set to a transparency of 100, such that they will not be seen in the reproduced image. In the second example, we are selecting just the facial region of an image, the rest of the image will be transparent. The face will have a 50% transparency, such that it will be blended with the existing background image at 50%. When used with SelectFaceInverse of a second image, we can swap the face of one person with another. The results of the face swap are much better if the exact facial outline is selected using one of the previously mentioned examples. Finally, in the last example, the background of an image is selected based upon image energy, where energy is described by Avidan and Shamir in "Seam Carving for Content-Aware Image Resizing" in ACM, Vol. 26, No. 3, July 2007, incorporated by reference herein in its entirety. The low energy area is considered background area, and in this case, the color of the background area will be made to match the primary color of what was in window opening 0.

The first example can be used to create adaptive montages of either aesthetic or practical significance. Aesthetically, special effects can be created, for example, in an advertising poster to add an image or text in a sky or background area of an image. The second example can also be used to create artistic effects, but can also be used to replace faces that have inappropriate facial expressions, eye closers, head pose, etc, with faces that are more appropriate. The second example can also be used in commercial purposes to replace, for example all the heads of models in the store circular with the children in ones family. A custom softcopy circular can be created for each household, not only with custom targeted content, but with family members wearing the clothing, operating equipment, or looking on in the distance. Social websites like Facebook can use such recipes to create custom slideshows for both pleasure and profit. The latter example can be used in context with the previously described adaptive recipes such that the end product more closely follows a theme or more closely resembles the artists intent. For example, the background information can be made to have the texture or color of a favorite image, made transparent or just driven to white so that the window opening can concentrate on the main subject.

In another preferred embodiment of the present invention, the recipe can include the usage of units in window recipes to specify the size and location of a particular face, main subject, or other object. For example:

```
<MetaDatum Label=" EastmanKodakCompany "
Tag="FacialEqualToNum" Datum="1" />
<MetaDatum Label=" EastmanKodakCompany "
Tag="FacialEqualToNumWeight" Datum="100" />
<MetaDatum Label=" EastmanKodakCompany "
Tag="FaceSize" Datum="0.5" />
<MetaDatum Label=" EastmanKodakCompany "
Tag="FaceLocation" Datum="Center" />
```

The first recipe line defines the current window required image attribute needs an image with one face. The second line says this required image attribute is mandatory—it is mandatory for the image to have exactly one face. Images containing 0 or greater than 1 face are not considered for inclusion in the current window opening. If no images with exactly one face are found, the recipe cannot be fulfilled, and (as with all other unfulfilled mandatory required image attributes) the job can be terminated, a notification can be provided to the user, an option to override the requirement can be provided, or an option for the user to insert a selected image can be provided, or the user can be prompted for some other type of intervention. The third line defines that this face must occupy 50% of the image area. Images with slightly smaller or larger faces will score high, images with large face differences will score lower. One formula used is 1−abs(TargetFaceSize−ActualFaceSize), but non-linear variants such as logarithmic, gamma, and similar functions can also be incorporated. Regardless of the preferred variations for evaluation, an image with one face, covering closest to 50% of the window area will be calculated to score the highest and be selected for inclusion in the template window. After selection, the image can be specified for post-processing and be resampled such that the face will occupy exactly 50% of the window area. The final line above specifies to center the face in the middle of the window opening. The FaceSize and FaceLocation key value pairs include the W0 and similar options such that the size and location of faces can mimic that of the favorite images placed in the template. In addition, because sizing is so critical, the FaceSize and FaceLocation key value pairs include the more advanced W0 notation, such as:

```
Tag="FaceSize" Datum="W0*0.8" />
<MetaDatum Label=" EastmanKodakCompany "
```

This defines, for a window recipe, that the face in the current window opening should be 80% of the size of the face in window opening W0. When multiple faces occur, the FaceSize and Location refer to the average face size and centroid of all faces. When W0|W1|W2 notation is used, it defines using an average size face from window openings W0, W1, and W2.

In addition to "Center", FaceLocation can include the rule of third locations, UpperLeft, UpperRight, LowerLeft, LowerRight, as well as Upper, Lower, Left, Right. The W0 notation for FaceLocation includes mirroring the location such as:

```
<MetaDatum Label=" EastmanKodakCompany "
Tag="FaceLocation" Datum="W0*HorizMirror" />
```

The above recipe line will mimic the horizontal location of the face—so if the face in W0 was in the upper third, the face in the current window would occur in the lower third of the image. To make relative locations as compared to W0, offsets are used such as:

```
<MetaDatum Label=" EastmanKodakCompany "
Tag="FaceLocation" Datum="W0+0.2H−0.3V" />
```

Where the above line says the face location in the current window should be the same as the face in window W0, but, should be offset 20% to the right and 30% towards the bottom. The above commands are illustrated for use in detected faces, but equivalent commands exist for main subject size and location as well as object size and location when the main subject is something besides a face.

Figure 6:
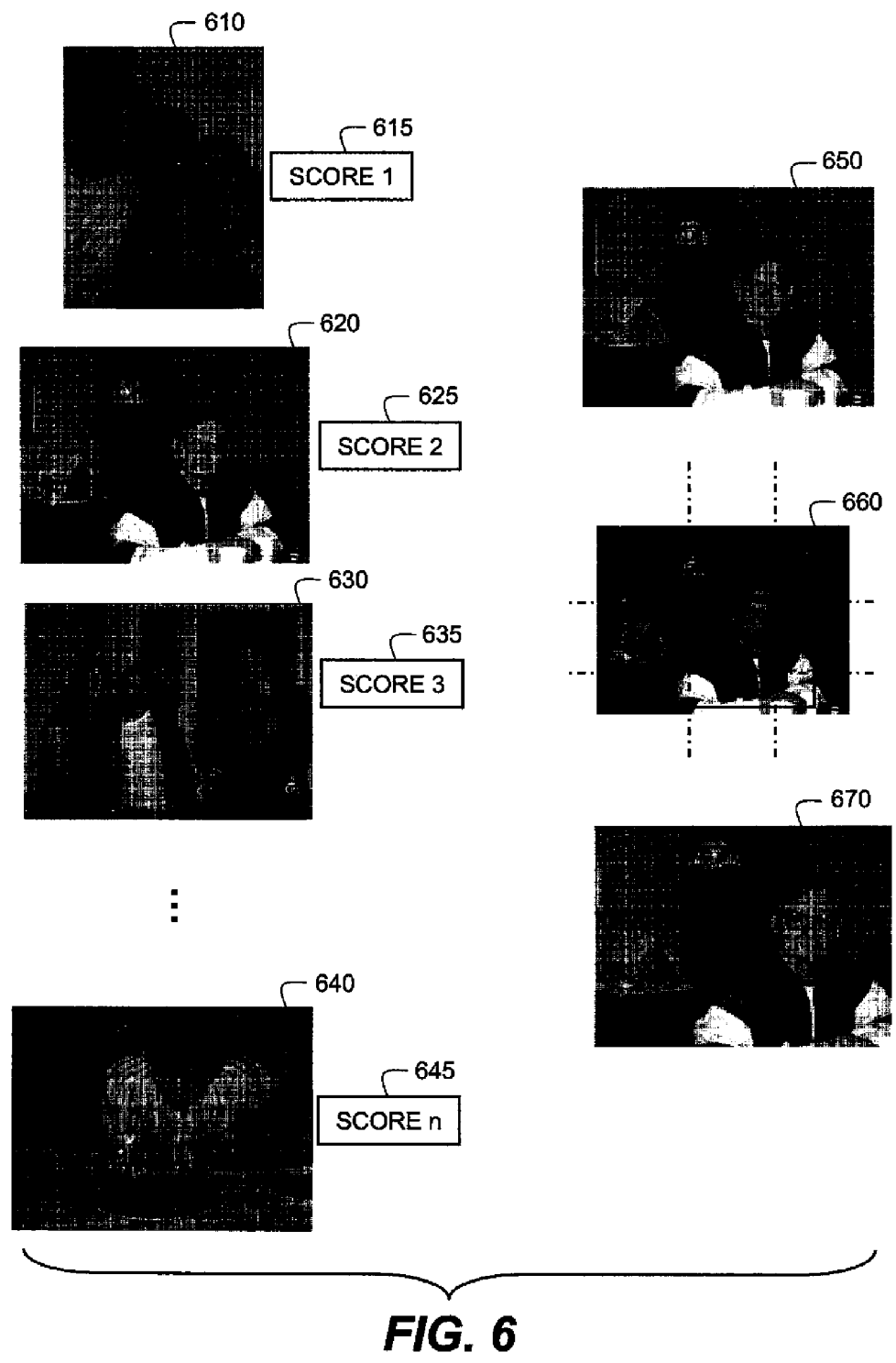
FIG. 6 illustrates image selection based on compatibility evaluation and image adjustment.

The process of evaluating the fitness, or compatibility, of multiple images as against a window recipe for a particular window is shown in FIGS. 4-6. FIG. 4 shows a window recipe for a window in a user enhanceable product, such as a picture frame. The required image attributes include: a favorite image with weight 20; contain 2 faces with weight 40; contain frontal pose with weight 20; and be indoors. The last two lines in FIG. 4 are used as a template/window specification for post selection layout, and not as an image selection guideline, and thus the last two lines do not have a paired weight line. Optionally, a user would then select their favorite image or images to be placed in prominent windows or other locations in the virtual template. FIG. 6 illustrates an example group of searchable images. There are n images displayed on the left. Each image's fitness will be evaluated according to the window recipe in FIG. 4. For the sake of simplicity, we will assume that the user has preselected image 2, 620 and image n, 640 as their favorites.

FIG. 5 shows the method of evaluation computation of each required image attribute for each image attribute. For each image attribute, we have a value, which is determined either by a metadata entry or semantic algorithm. This value is between 0 and 1.0, where 0 is the lowest possible score, and 1.0 is the highest possible score. After multiplying by the accompanying attribute weight, a resulting weighted value for each required attribute per image is obtained. After summing up all weighted values for each image, a total image score is obtained. The image with the highest total score is the closest compatibility match to the recipe.

The first listed attribute is for favorite images. 620 and 640 receive a value of 1. 610 and 630 receive a value of 0. Multiplying by the favorite weight of 20, we get weighted values of 0, 20, 0, 20, respectively, for each of the four images shown.

The FacialCloseToNum attribute favors images with 2 faces. Unfortunately, none of the images have two faces—each image having one too many, or one too few faces, giving a value of 0.5 for each image. Since the FacialCloseToNum weight was 40, multiplying 40 and 0.5 results in a weighted value of 20 for all four images.

The FacialPose attribute favors all frontal poses. Facial pose estimators return the pitch and yaw of a face in degrees. The value is calculated by setting value=(100−(Pitch+Yaw))/100, and then clipping such that the value calculation is normalized from 0 to 1.0. This strongly favors frontal poses where pitch=yaw=0, and penalizes poses otherwise.

The Location attribute is looking for indoor scenes. State of the art indoor/outdoor locators use metadata tags of ISO, exposure time, and flash fire, along with key semantic information such as foliage and sky colored pixels, along with overall color temperature of the scene. The returned value is an estimate that the scene is indeed an outdoor scene. For scenes 1,2,3,n, the value returned was 1, 0.7, 0.25, and 1, yielding weighted values of 9, 7, 2.5, and 10.

With the evaluation of the above weighted values for each image and attribute completed, we sum the weighted values for each image, giving a total of 49, 67, 42.5, and 55 for images 1, 2, 3, and n and assign to 615, 625, 635, and 645 in FIG. 6. 67 is the highest total score, corresponding to image 620. Image 620 satisfies the window recipe illustrated in FIG. 4 the best and is selected 650 for inclusion in the window opening.

The last two lines of the recipe in FIG. 4 provide post-processing instructions for image 650. The Offset UR says the face in the image should be located in the upper right rule of thirds intersection. The FaceFill attribute indicates that the size of the face should be 20% of the width of the window opening. The above two rules are shown schematically, 660 in FIG. 6, along with the final image, 670.

Additional post-processing instructions can be utilized to change the color, tone, sharpness of images and change the relative color, tone, contrast to other window openings as follows:

```
<MetaDatum Label=" EastmanKodakCompany "
Tag="AutoEnhance" Datum="1" />
<MetaDatum Label=" EastmanKodakCompany "
Tag="Contrast" Datum="<W0" />
```

Where the first example defines applying an autofix or automatic image enhancement to the image in the current window. Similar entries exist for AutoNeutralBalance, AutoColorBalance, AutoContrast, AutoSharpness, and AutoZoomCrop. If AutoZoomCrop is used, and the window opening still scores highly if small, outlier faces are automatically cropped out of the image, they will be cropped out as long as the resulting image resolution is sufficient for the final enhanceable product. The second example indicates that the contrast of the image in the current window should be less than the contrast than the image in window 0. Similar entries exist for Colorfulness, Brightness, and Sharpness. In addition, the Datum values of ">W0" would mean the criteria in question would be greater than window 0; and ">>W0" would indicate the criteria in question would be much greater than window 0.

The concept of using the > and < characters in the recipe also allow relative specification of window content. For example:

```
<MetaDatum Label=" EastmanKodakCompany "
Tag="AgeClosetoNum" Datum=">W0" />
<MetaDatum Label=" EastmanKodakCompany "
Tag="AgeClosetoNum" Datum=">(W0+10)" />
<MetaDatum Label=" EastmanKodakCompany "
Tag="AgeClosetoNum" Datum="<(W0+30)" />
```

Where the first example defines having the current window contain a person whose age is greater than the estimated age of the person in window 0. If >> was used, the age would have to be much greater. These relative relations can be easily defined within the program as desired, for example, ">" could be defined as five years, and ">>" could be defined as fifteen or twenty years. The next two examples show how to specify the age of the person in the current window to be between 10 and 30 years the estimated age of the person in window 0. The addition of >, >>, <, and << along with the offsets, | (averaging), and ~ (inverting) enable a rich suite of tools for the artist.

The described embodiments of the present invention are not limited to the values and attributes defined herein, and can be extended to other parameters as an artist sees fit. As computer and hand held device algorithms evolve, future available image metadata can be incorporated. While some metadata tags are easy to evaluate, such as time stamp, others are more complex, such as selecting images with balloons. As the recipe is loaded into the program, a list of necessary attributes is accumulated, and only those attributes that are required for a particular image enhanceable item 300 are resolved for each image.

Another preferred embodiment of the present invention is the usage of adaptive recipes. For example, a user is making over a room in his home and would like to hang decorative image enhanced items on the wall. The user can bring a paint sample from the room to a retail kiosk that is running a computer system program embodiment of the present invention such as on computer system 26, and the paint sample can be scanned by the kiosk's flatbed scanner 38. This paint sample can be used to define overall color and texture required image attributes for the decorative image enhanceable wall hanging. Similarly, a frame or matte can be scanned for defining attributes such as color and texture. If a flatbed scanner is not available to kiosk computer system 26, a calibrated webcam or video camera at a kiosk will suffice. Similar techniques can be used if a user brings in a swatch of material, such as a pillow, cushion, curtain, or any other object in the room to be decorated. Not only can the resultant user enhanceable product be made to match this material, the background matte of the template can be a replication of the actual material or paint sample. Finally, a user can take photos of objects or walls, and those objects can be used as the reference digital image. For example, a user may provide four reference materials, R0 can be a paint swatch, R1 can be a curtain, R2 can be a pillow, and R3 can be a sample from a magazine. The following window recipe examples can be applied to these samples.

```
<MetaDatum Label=" EastmanKodakCompany "
Tag="ColorIntent" Datum="R0" />
<MetaDatum Label=" EastmanKodakCompany "
Tag="ToneIntent" Datum="R1|R2" />
<MetaDatum Label=" EastmanKodakCompany "
Tag="MattColor" Datum="R0" />
<MetaDatum Label=" EastmanKodakCompany "
Tag="MattTexture" Datum="R3" />
```

In the first example, the color of an image in the current window can be made to match the color of R0, which is the paint swatch. This is done by first digitally balancing the image to neutral and then adding a color cast to the image—the color cast being a match to the color cast of the paint swatch. In the second example, the tonescale of the image can be similarly manipulated to match an average contrast of the curtain and pillow. In the third example, the matte color will be adjusted to match that of the paint sample. In the final example, the matte texture will be adjusted to match the texture sample from the magazine clipping. The above use of reference images is very similar to the window matching entries described above, say Datum="W0", but the key difference is that the reference image in these examples is not displayed in the completed coordinated image template design or in the final image enhanced product.

Another preferred embodiment of the present invention involves the evaluation of multiple window recipes on a single set of images. For example, a Famous Designer may come out with the Fall 2008 line of template recipes. Depending on the images provided by a user, one particular template recipe might be more appropriate than another. For example, if a customer loads a group of images containing sports scenes, a Famous Designer sport theme template recipe may be used initially to begin designing the final image enhanceable product. If the customer loads images of children, a Famous Designer infant or toddler theme may be selected. If a customer loads a group of images containing water scenes, a Famous Designer beach template may be chosen. The names of the template themes can also be displayed to a user so that the user can select and open a template initially whose name reflects the type of context that fits the user's image collection. The selection of a favorite image will also cause some templates to score higher than others. Based on a different selection of a favorite image, the templates that score highest can change drastically. The highest scoring template as calculated by the program can be used, or the top n highest scoring templates can be programmed to be presented to the customer for him/her to make a final decision as to which is his/her favorite template. The procedure that is followed to identify the types of scenes depicted in groups of customer images is well known in the art and is not described further.

If several favorite images are selected by the user, the corresponding highest scoring templates can be presented to the customer, or the top n templates for each favorite image can be presented, or the top n templates for only the top scoring favorite image can be presented. The types of such template recipes is virtually unlimited. Image enhanceable items 300, can include framed templates, clothing items, greeting cards, photo books, and other tangible goods; but also to softcopy goods as well such as cell phone, PDA, and computer screen savers, digital greeting cards, as well as digital picture frames, and automatic digital presentations used in store fronts, office lobbies, stadiums, theatrical shows, and for personal enjoyment.

In another preferred embodiment of the present invention, a unique template recipe is assembled on the fly and pre-selected recipes are displayed in a pre-determined or random order. For example, a continually running slide show on a digital picture frame (which can be a picture frame at home or a large electronic storefront window) may automatically extract photos from a public or private website, or from a local computer. Each and every displayed frame can be unique and can be programmed never to be shown again, if so desired. A preferred embodiment of the present invention includes a procedure of writing a continually looping program that modifies the recipe in each iteration. During each iteration, the top x compositions are displayed in a random or a predetermined order. When selecting images from online galleries such as Facebook or Flicker, or Photobucket, the number of high scoring template configurations can be staggering- and a limit can be imposed for each iteration of the looping program. The looping program can have nested loops, each changing one or more recipe entries in random or predetermined order. Fulfilled recipes can be stored in a database to prevent displaying the same recipe twice, or to purposely replay recipes in a preprogrammed or random order.

Template recipe entries can be configured by, and grouped according to, product line and can be upgradeable over time. A similar architecture can be used in many product lines, with a baseline product only offering a subset of required image attributes to be selected, a moderate product offering an extended set of selectable required image attributes, and a premium product offering a full suite of required image attributes. In addition, the attribute readers can be designed to be forward compatible by ignoring any attribute values it does not understand or can not evaluate. This can occur if, for example, a new artist's collection of templates uses attributes not recognized by a previous version of the program. For example, if balloon object extraction is not supported, it is simply ignored.

In another preferred embodiment of the present invention, a unique template recipe is used for advertising purposes. For example, the template is used in electronic displays 190 located at store fronts, airport lobbies, office complexes, and any other locations where they might attract a consumer. Thus, the templates can be created in advance by marketing and artistic teams, who put together product displays in a pleasing manner. For example, a digital display may be stored on a computer system that includes kids playing on a beach. The template would be defined as a beach oriented theme. The window opening or openings contain various images of children wearing the latest line of summer wear. The template background may also include beach scenes or beach objects. A side window can include matching flip flops or sun tan lotion as predescribed by the recipe tags. The actual stored images are not specifically preselected to be displayed in advance, however, the content of such images is controlled via the recipe as far as image retrieval purposes are concerned. The usefulness of this design is that various images can be mixed and matched according to the recipe, and the display can keep changing.

Textual information can be stored as part of the image, or as part of the background template or be rendered as images in advance and then inserted into a window opening in the usual fashion as defined by recipe templates. The choice of how to include the textual information is up to the designer. Making text part of the template can generate a large number of potential variations of templates, but these likely would be occasion-specific. Making text part of the images limits use of the images. An option is to include the text in a separate window but that would require a strong relationship between a text window and another. To resolve this, a few new recipe commands have been designed, as follows:

---

<MetaDatum Label=" EastmanKodakCompany "
Tag="OverlayText" Datum="All Flip Flops 50% off!"
/>
<MetaDatum Label=" EastmanKodakCompany "
Tag="OverlayTextFont" Datum="TimesRoman" />
<MetaDatum Label=" EastmanKodakCompany " Tag="
OverlayTextLocation" Datum="(0.2,0.8)" />
<MetaDatum Label=" EastmanKodakCompany "
Tag="OverlayTextLocation" Datum="FreeSpace" />
<MetaDatum Label=" EastmanKodakCompany "
Tag="SisterImage" Datum=" (W3,2)" />

---

The first example above demonstrates how to add text to a window opening. Since each window and the template have their own commands, one can easily control the text in each window as well as in the template. The next few recipes described below illustrate how to control font and location of the text image. The location syntax includes the relative (X,Y) coordinates of the window opening, with the upper left=(0,0) and the lower right=(1,1), but other conventions can be used. Similar entries control text size, color, texture, and formatting. Multiple occurrences of text are allowed. The formatting commands apply to all text beginning at a particular point in the recipe. This way, some formatting commands can be applied repeatedly to later appearing arguments in the recipe.

The fourth entry above directs that the OverlayTextLocation should be in FreeSpace. This means that the test will be disposed in the "lowest energy" area of the image automatically. This works well when the images have no pre-planned areas for text and a programmed computer can often do a better job at placing the text than a layperson. U,S. patent application Ser. No. 09/398,221 filed Sep. 17, 1999 and now granted as U.S. Pat. No. 6,711,291 describes methods for doing this and is incorporated herein by reference in its entirety.

The final entry describes how to bind two window openings together. The "SisterImage" keyword says that the current window opening should be filled in accordance with the precise image from another window opening. In this case, the argument is (W3,2), which means the current window opening contents are dictated by the actual image in W3, option 2. After W3 is fulfilled, the program performs a contextual lookup based on the W3 image name. For example, if the image that filled window opening W3 was called SummerFun0123.jpg, the contents that fill the current window opening would be called SummerFun0123_s2.xxx; where the trailing "_s2" indicates SisterImage2. The xxx file extension is generic, as any commonly supported image format is supported. In addition, if the extension is "txt", this instruction inserts the text in the file SummerFun0123_s2.txt into the current window opening. One can use the previously described formatting options to control the actual look of the text.

To make the storefront displays more compelling, a video camera, e.g. 38, can be mounted above the display, pointed toward people observing the display. Thus, a display such as display 190 can be implemented and controlled by an appropriately programmed computer system for presenting various products available from a particular merchant. The people who are within a focal field of the video camera are automatically detected, their image is digitally captured and monitored as they move about, and each individual can programmably be maintained as a focal point of the video camera. Recipes can be adapted for implementing such captured digital still or video images in a template. The recipe can be programmed to change based upon gestures detected from the people looking at the display. For example, the initial display may have window openings depicting a few models showing some offerings from a famous designer's spring line. As the viewer looks left, he may be looking at a blouse whose position relative to the camera is known, a plurality of images of the blouse from different angles, for example, is stored in the computer system, and other relevant information is stored and programmed for use by the computer system. After the camera detects the person's gesture or movement, the computer can recognize which direction a person is directing his attention, and will then display pop-up information about the blouse—information about the designer, and what colors and sizes the blouse is available in. The person(s) might then looks to the slacks worn by the manikin (or model) on the right. The old pop-up information disappears, and new information appears about the slacks. The person might then look at the shoes of the model in the center, and in addition to the color/size/styles available, it can give real-time inventory status and then audibly tell, over a speaker system, or display text for, the consumer that if he gives the cashier coupon code ABC123, he will receive 25% off any pair of shoes in the store. A reference that describes how human computer interfaces can be controlled by human facial pose is described in Ptucha, Raymond, "Facial Pose Tracking for Interactive Display", IEEE, Western NY Image Processing Workshop, Rochester, N.Y., 2009, which is hereby incorporated by reference herein in its entirety.

Once again, SisterImage recipes are used to accomplish this task. The key difference here is that the window openings described by these pop-ups are normally transparent. They are triggered by, in this case, someone's focus of attention, or physical pose being directed in a particular direction. These window openings have a special first line declaration such as "PopUp" when the window is first instantiated in the recipe. These PopUp window openings have special recipe controls such as:

```
<MetaDatum Label =" EastmanKodakCompany "
Tag="PopUpTrigger" Datum=" (W1,FOA) " />
<MetaDatum Label=" EastmanKodakCompany "
Tag="PopUpDuration" Datum="20" />
<MetaDatum Label=" EastmanKodakCompany "
Tag="SisterImage" Datum=" (W0,27)" />
```

Where the first recipe entry above describes under what conditions the window appears. (The window size and location is determined by the template.) In this case, the FOA argument says popup when a consumer's focus of attention is on window opening 1. More methods of popups will be described shortly. The second recipe example above controls how long the pop-up will appear after the initial trigger. If a consumer continued to stare at window opening 1, the popup would remain visible until the timer expired, and a new popup instance is instantiated. The third recipe item above is the previously described SisterImage tag. This will allow popups to be images or text as described previously. A useful application of this feature is that the pop-up trigger can be based on window opening 1, while the popup content can be driven by another window opening. Under a preferred embodiment of the present invention, this feature is an available option for the recipe creator. In some cases, it is easier to create a single window opening, e.g. W0, which contains blank content, with a file name of <template_name>.jpg, but has lots of Sister-Image images and textual contents. In the above recipe, when a consumer looks at window opening 1, the image or text in <template_name>_s27.xxx is displayed. This allows for the store merchant to only update files in one single location, mainly files of the format <template_name>_sn.txt, where n is the sister image iteration.

Using a consumer's pose is an example of a simple interactive display using recipes. This interactivity can easily be extended to a customer's facial expression (happy, sad, angry, etc.), facial animation (yawn, stick out tongue, wink eye, etc.) , and body gestures (pointing, turning, getting closer or further from display, walking away).

For example, if the display system detects that someone is happy, it can be programmed to continue displaying similar recipes, if it detects that someone is sad or angry, it can be programmed to quickly change content. Similarly, if a customer sticks out their tongue, they are probably not pleased with the content. Finally, detecting that a customer is pointing to an object with an arm/hand, would indicate that a user wants more information on a particular product. Walking closer might mean the consumer is focused on a product and a merchant using the display system might prefer that the recipe should not change. Walking away might mean that the user has lost interest and a detection of that can trigger the recipe to reset itself.

Once again, recipe lines are needed to trigger such behaviors appropriately. We previously showed how the PopUpTrigger key value pair worked with focus of attention (FOA). It can also work with pointing gesture, POINT, bodypose, BODY, or a combination of FOA, POINT, BODY with other expressions or animations. For example,

```
<MetaDatum Label=" EastmanKodakCompany "
Tag="PopUpTrigger" Datum=" (W1,POINT)" />
<MetaDatum Label=" EastmanKodakCompany "
Tag="PopUpTrigger" Datum=" (W1,POINT & HAPPY)" />
<MetaDatum Label=" EastmanKodakCompany "
Tag="PopUpTrigger" Datum=" (W1,FOA & MOUTHOPEN)" />
<MetaDatum Label=" EastmanKodakCompany "
Tag="PopUpTrigger" Datum=" (W1,FOA & BODY & TONGUE)" />
```

The above recipe entries describe under what conditions the window appears. In the first recipe, the POINT argument says popup when a consumer points toward window opening 1. The second recipe says popup when the consumer is pointing and happy. The third says popup when the user is looking at W1 and their mouth is open. The fourth says popup when the user is looking at W1, their body is facing towards W1, and their tongue is out. Similar recipe items exist for all common facial animations and expressions in combination with head pose, body pose, and pointing gesture. In addition, recipe lines can be written to change content based upon a detected user's distance from the video camera:

```
<MetaDatum Label=" EastmanKodakCompany "
Tag="SisterImage" Datum=" (W0, 3)" />
<MetaDatum Label=" EastmanKodakCompany "
Tag="PopUpTrigger" Datum=" (W1,FOA)" />
<MetaDatum Label=" EastmanKodakCompany "
Tag="PopUpModify" Datum="Distance+" />
```

The above recipe lines says that when a user looks at W1, the SisterImage, offset 3 from window 0 is displayed. The last line says that as the user gets closer, more information is displayed. If the initial popup information were contained in the file <template_name>_sn.txt, the new information is in the file <template_name>_sn+.txt. The limits are endless with respect to recipe creation. For example, as the user gets closer, the popup can get bigger, smaller, become enhanced, animated, or a second or third window can appear.

In the above example, if all consumers walk away, the recipe can be programmed to reset itself to a beginning state or a default display. In the above example, this will happen naturally based upon the default PopDuration settings. However, the template itself can change over the course of time, or the window openings inside the template can change over time. For example, when defining a window opening recipe, one can specify:

```
<MetaDatum Label=" EastmanKodakCompany "
Tag="PickNewImage" Datum="(5.2,10)" />
```

This program portion says to insert a new image in the current window opening every 5.2 minutes, and continually cycle through the top 10 highest scoring images that fit that window opening. This allows some window openings to be temporally changing, while others remain static. The selection of the window opening contents is selected by the rest of the window opening recipe lines (which specify for example, the number of people, color content, subject matter, etc.). The limit of 10 helps control the diversity of the window opening content. (Setting it to 1 essentially turns off the image transitions; setting it to 1,000,000 essentially ensures it will appear to always be unique.) The selection of image ordering is done by fitness, where the highest scoring images are displayed before the lower scoring images.

To help collect targeted marketing information, statistics from the camera/computer system can be generated. For example, it is common to be able to guess a person's age, height, weight, gender, race, etc. The system could, for example, keep statistics to see what percent of people looked at the Marta Stewart scarves. Of course, it would even be better to know what percent of those people were female Hispanics between the ages of 20 and 40. This information would be collected seamlessly as the recipe program continues to loop its content. Such information can be used for targeted marketing campaigns or be used to help launch new, more targetable or profitable products in the future. To enable this informational gathering, the recipe controlled interactive display system is continually writing to a parsable log file. In this log file, all the detectable attributes of consumers are stored. Each stored system entry contains information for a timestamp, what window they were looking at, what window they were pointing at, what window their body was facing at, their facial animation, and facial expressions, along with their age, height, weight, gender, and race information.

Digital camera technology has gotten to the point where programming is not only able to recognize if a consumer is male or female, young or old but, as previously described, one can also extract faces from one scene and insert them into another. Many Logitech branded QuickCam PC cameras include an application which performs such a function. However, the Logitech application is neither template driven, nor applicable for a hands free human computer interface.

For example, if the digital display contains pictures of models wearing sample clothing from the latest spring line, an interactive sequence might be triggered as follows. A consumer walks up to the display and as he looks at one outfit in the upper left window, pop-up information is added to the display. This generally intrigues the user and encourages further interaction. If the user stares at a particular model for more than n seconds as measured by programmed application, the users face is super-imposed on the models face so that the consumer can see what he/she might look like wearing that outfit. Standard body extraction software can estimate the consumer's height/weight, and if the recipe contained a series of stacked images, the image that most closely represents the consumer is displayed with the consumers face super-imposed. Stacked images are a series of images of the same general content, but with different people wearing, using, or interacting with the same outfit or object. Different customers might be shorter-taller, lighter-heavier, and of various ethnicities. Not only would this display give the consumer a better feeling for whether this product is a good purchase, it would be entertaining to use. The entertainment value alone would attract more consumers, and the more consumers that interact with the display, the more purchases could potentially be made. As consumers are coming to the display, the computer system driven camera/display is collecting statistical demographic information to help with future sales.

To enable facial and body overlay, we define a few new recipe tags to the window openings. Like the popup windows, these tags are transient in nature and are controlled by a customer's focus of attention, pointing, or body positioning. Like popup windows, the template resets itself when the user walks away.

```
<MetaDatum Label=" EastmanKodakCompany "
Tag="OverlayFace" Datum=" (W1,FOA & HAPPY)" />
<MetaDatum Label=" EastmanKodakCompany "Tag="
OverlayBody" Datum="(W4,POINT)" />
<MetaDatum Label=" EastmanKodakCompany "Tag="
ThinnerBody" Datum="(W5,POINT)" />
<MetaDatum Label=" EastmanKodakCompany "Tag="
ShorterBody" Datum="(W6,POINT)" />
```

The first line in the recipe above says to overlay the face of the person who is looking at window 1 if they are happy. In general, W1, can be replaced with Wn, where n is the current window recipe entry. The next three recipe entries utilize a more interactive type of display, where the consumer is controlling what they see. For example, in the second recipe entry, if the user points to window 4, the body of the interactive consumer will be replaced with the model on the interactive display.

In general, the interactive display can have reserved areas dedicated for user input. For example, in window 5, the textual message may read "make model thinner"; while in window 6 above, the textual message may read "make model shorter". Similar windows can display "reset", another might be "overlay my face", while another might be "show me in various outfits". So, by pointing to one of these reserved areas, the consumer can have more control over the display.

With respect to the final recipe entry, above, when the consumer points at window 6, where window 6 displays an image or text which conveys the message to the user to make the model shorter, SisterImages are used, but, instead of '_s' suffixes appended to the image name, we have incorporated '_r" suffixes, where the 'r' stands for repeat image. Any image that supports stacking will have corresponding images stored with r suffices. For example, if the image being displayed is casual_dining123ABC.jpg, stacking will generate, store, and expect to find images of the sort dining123ABC_r_xh_yw_ze.xxx, where x is an indicator of height going from −10 to +10, y is an indicator of weight going from −10 to +10, and z is an indicator of race going from 1 to <maxNumberofEthniticities>. Once again, we use the xxx extension, since multiple image formats are allowable within the present system. If a consumer selects a stacked option that is not available, either the closest available match is used or an appropriate message is displayed on the screen, or both.

Stacked images not only support displaying different height, weight, and ethnicities, but also support display of different clothing or different products. For clothing, we can cycle through different outfits. For products, we can cycle through shots of different lawn mowers, food mixers, or any other item such as rock band video clips or travel agency destinations. To allow for such general stacking, the image names are simply <filename>_rn.xxx, where n is a repeat number. The consumer can cycle through images until they find an image that they prefer.

Its possible that large groups of people may gather around an embodiment of the present invention comprising a storefront display. While it is certainly possible to track and work with more than one person at a time, at some point, the system may need to arbitrate who is in control of the display or who will remain the focal point of the detection system. This can be addressed by using a FIFO queuing mechanism—first in, first out.

In other words, the first consumer to arrive remains the focus of the system. When that person leaves, the next person who arrived is "in charge."This strategy can be modified by analyzing facial pose, face size, etc. For example, if the next person is looking away, we can set the program to automatically jump to the third person in the queue. A person closer to the camera/display system can be selected as the person of focus. A dedicated window opening in the template can be programmed to display who is the person of focus for the interactive session. The video can include demarcations showing the locations of all faces, their size, and pose. These can be color coded so that the warmer your face outline, the closer you are to being first in the queue. The cooler your face outline, the further back in the queue you are. The person who is actually "in charge" can be displayed with a bright bold red facial demarcation for easy identification.

While the above display can try to faithfully reproduce an image of the consumer in the digital display, it can also purposely alter the consumer in some fashion. This can be done for entertainment (think clown mirror) or for information gathering purposes. For example, if the display is disposed in front of a hair salon, as the consumer looks at the different models with different hairdos, the consumers face can be superimposed. Or, by used a reserved area button labeled "change hair style" or "cycle through hair styles" or "change color", "change length", "add body", "add curls", etc, the user can stand in front of the salon until she finds the style she wants. The recipe can be set to keep cycling through the stacked repeat images until the consumer finds a satisfactory image. By gesturing (e.g. pointing), to the reserved area that says, "save style", a printout or display of that person with that particular haircut information is provided to the salon clerk. These interactive displays are all recipe driven, so that on one day, the salon may want to advertise hair coloring, while on another day, they may want to have recipe's that demonstrate a pedicure service or new shampoo line, while on another day a simulation of images of consumers' faces are shown "before and after" a deep facial cleansing using facial beautification software.

Potential designs for interpreting and using the corresponding attributes is numerous. At the highest level, a parameterized and weighted fitting algorithm scores each individual image from a set of required image attributes for each window in the template. The objective of the parameterized weighted fitting algorithm is to find the best (most appropriate) image for each window based on image/template image window required attribute comparison. As used throughout herein, a "required" opening attribute (or window attribute) is a soft or hard (depending on weights) requirement, defined in a recipe, that an image must satisfy. Image attributes are the metadata describing image characteristics that are extracted by digitally examining an image, or provided by a user, or generated by a camera, or otherwise provided and stored with an image or generated on the fly. The parameterized weighted fitting algorithm iterates through a list of windows and scores each image relative to required image attributes for a window and finds the best image for that template window.

Figure 7:
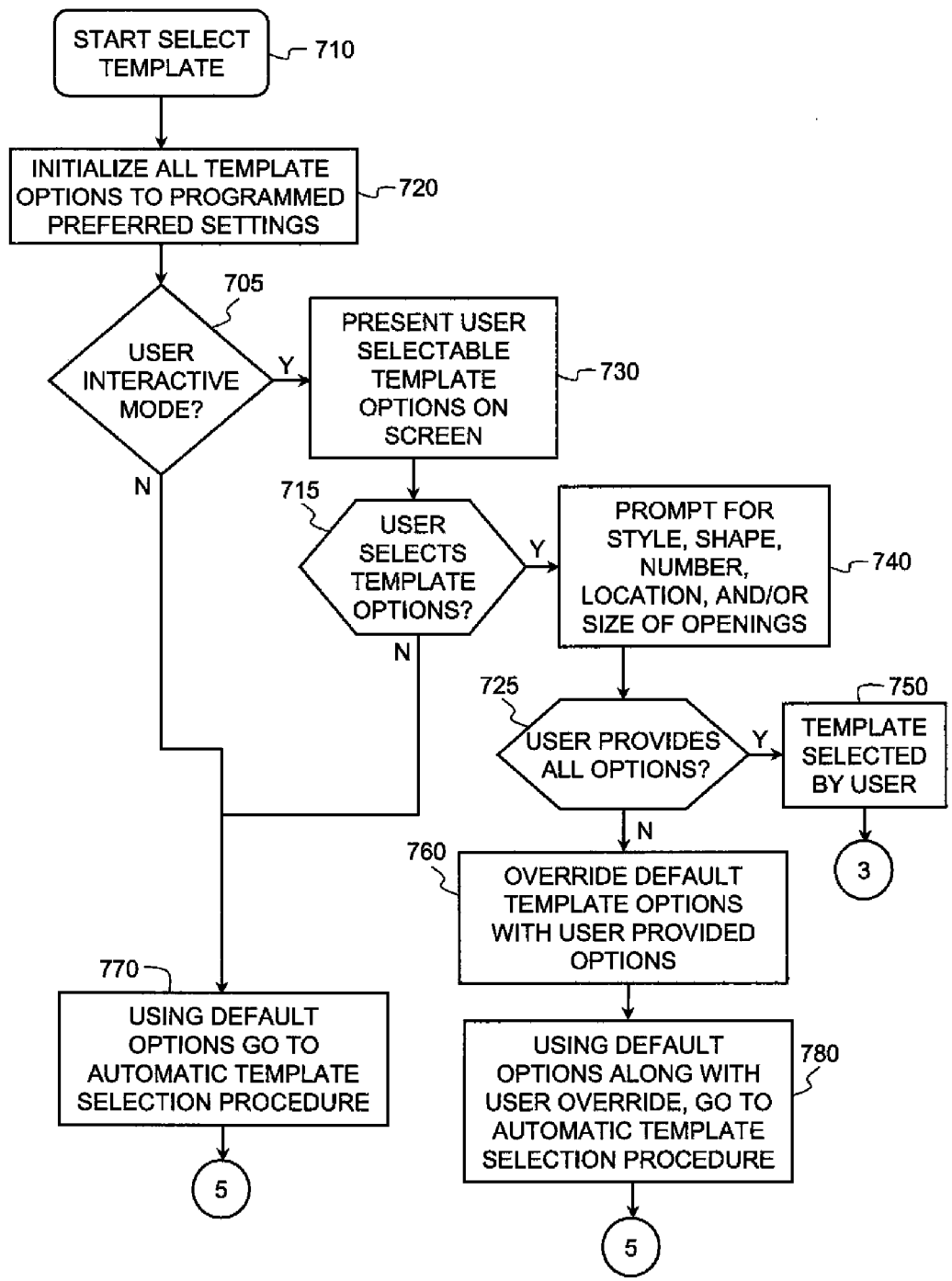
FIG. 7 illustrates a flowchart for template selection.
Figure 8:
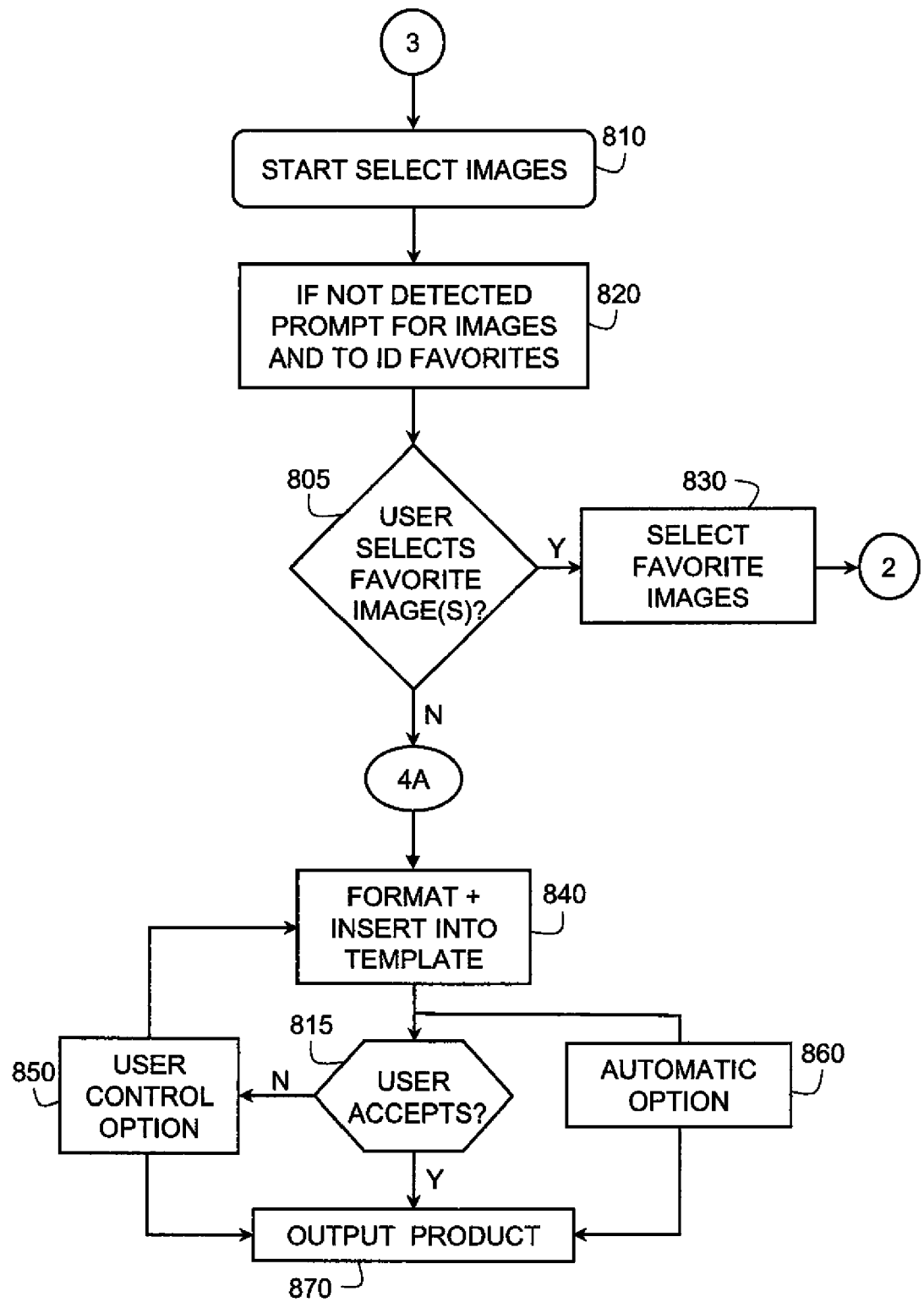
FIG. 8 illustrates a flowchart for image selection.

The algorithm by which a preferred embodiment of the present invention is implemented is described in reference to FIGS. 7-12. The algorithm is implemented on a computer system such as depicted in FIGS. 1 and 2 and described above. The user interacts with the computer system via user controls 68, 58, also explained above, in response to information displayed on screen 56, 66 as performing actions requested by the user or by prompting the user for information or for making a selection. Referring to FIG. 7, the algorithm starts with presenting a template selection function 710 on display screen 56, 66. In this algorithm example and following description, we will assume that the templates presented for selection are of a form corresponding to a picture frame, as shown in FIG. 3, that the user desires to purchase. Succeeding steps of the algorithm can be implemented in well known graphical user interfaces for prompting the user for selecting options or for other information. In a preferred embodiment, the template selection displayed on the screen will physically resemble the actual picture frames available to the user for purchase. If a user has selected a mug or a tee shirt, then the displayed "virtual" template may be designed to resemble those products so that the user can see a reasonably realistic version of a desired image enhanced product that includes an image selected by the user. In the example algorithm illustrated in FIG. 7, the template options are set to default values initially at step 720. At step 705 a user selects whether he would like the system to choose a template or to participate in the template selection. If the user elects an automatic option then the system will select and store a default template at step 770 and then proceed to step 1010. If the user elects to participate then the system will display template selection options at step 730. If the user decides at this point, step 715, not to select a template then the system will revert to an automatic default template selection. If a user selects a template at step 715 the system will request the user to select template characteristics at step 740. If the user selects all requested characteristics options at step 725 then the template is complete and the next step proceeds to step 810. If the user does not provide all options at step 725, default values for unselected options are automatically stored at step 760 and the complete template specification is stored at step 780 and proceeds to step 1010.

At step 810 the template was selected by the user and now the image selection begins. If the user has not yet provided images, either in a local computer accessible database, a network accessible database or on a portable or other storage device, then at step 820 the system will prompt the use to identify where images can be accessed. The prompt may or may not occur if a data base has previously been identified to the system or if a user has coupled a portable or other image storage device to the system. If the user indicates at step 805 that he will select favorite or primary images, then at step 830 he will indicate the selected images to the system and at this point the system will automatically proceed to step 905. If the user indicates that he will not provide favorite or primary images at step 805, then the system will automatically select images based on the step as defined in block 1210. At step 840 these automatically selected images will be digitally placed into the previously selected template. At step 815 the template and selected images will be displayed to the user on a screen or monitor and the user will have the option to accept the image product, however, the present invention includes an option 860 for the user not to review the image product. If the user accepts or if the user does not review the product, the product is output at step 870. If the user does not accept the output product at step 815, then the system repeats an automatic image selection using step 1210, but outputs a template plus images that is different from any previous outputs. Alternatively, a user control option 850 can be executed at this point wherein the user performs his own selection steps instead of the step 1210 performed automatically by the computer, and the user's selection is then output at 870. The user control option can be implemented via activation of an image editing software that is part of the image enhanceable product software or it can be implemented by a separate image editing software. The output step 870 operates according to the type of image enhanceable product that the user has selected. For example, and not by way of limitation, if a frame has been selected, then the output can involve a frame with selected images being delivered to the user (home delivery or retail outlet pick-up for example), or a page with the selected images may be printed which the user can insert into an actual frame that matches the digital frame depicted on the display.

At step 905, after the user has identified favorite or primary images on the computer system, the algorithm determines if the number of primary images identified is greater then the number of openings in the template. If so, then at step 1240 a subset, equal to the number of openings, of the favorite images whose image attributes satisfy required template attributes and template opening attributes, if any, are automatically selected and then in step 910, the template, together with the subset favorite images disposed in the openings is composed, and is displayed to the user for user approval at step 915. If an option to bypass user approval 912 is active then the template and automatically selected subset of the favorite images is output at step 916. Otherwise, if the user approves the template and images, the user indicates acceptance to the computer system of the template and images as displayed and the output step 916 commences. If the user approval step results in a non-acceptance by the user then the system proceeds back to step 910 to repeat automatic image selection as described above, except that the output of the automatic image selection step will be selected to be different than any previous output. As usual, programmed preference is given to higher scoring images that best match required template opening attributes, but if the user does not accept these, then lower scoring images will be used. If user control option 914 is activated then the user has the option to specify favorite images without reactivating the automatic selection step 1240. This can be performed by presenting to the user the template with current selected images displayed therein, and an option to replace the current images with other user selected images from an image data base. The user's favorite image selections are then used in the output step 916. At this point it is an optional programming step to limit the user option to only those images that are favorites, selected at step 830, or to present the whole user's image data base for selection.

If the number of favorite images is determined not to be greater than the number or template openings at step 905, then at step 925 the computer system determines, according to the programmed algorithm, if the number of favorite images indicated by the user is equal to the number of template openings at step 925. If so, in step 1230, each favorite image is assigned the optimal window such that the overall template score is maximized, then the images are placed in said window openings in step 940, and then output step at step 946. If an optional user control step 942 is active, the template and images disposed therein are displayed to the user to enable the user to select different templates or images, or to rearrange the images displayed. After the user has completed his selections, the output step 946 is activated.

If, at step 925, the computer system determines that the number of favorite images is not equal to the number of template openings, the algorithm selects additional images to compliment the favorite images using step 1220 which is described above. At step 930 these automatically selected images will be digitally placed into the previously selected digital template. At step 935 the template and selected images will be displayed to the user on a screen or monitor and the user will have the option to accept the image product at step 935. This embodiment of the present invention includes an option 934 which, when activated, allows the user to bypass review of the image product and go directly to output step 936. If the user accepts the displayed image product, or if the review bypass occurs, the image enhanced product is output at step 936. If the user does not accept the output product as displayed at step 935, then the system repeats an automatic image selection using step 1220, but outputs a template plus images that is different from any previous outputs. Alternatively, a user control option 932 can be executed at this point wherein the user performs his own selection step instead of the step 1220 performed automatically by the computer, and the user's selection is then output at 936. The output step 936, as do each of the other output steps described above, operates according to the type of image enhanceable product that the user has selected. For example, and not by way of limitation, if a frame has been selected, then the output can involve a frame with selected images being delivered to the user (home delivery or retail outlet pick-up for example), or a page with the selected images formatted to match the template openings may be printed which the user can insert into an actual frame that matches the digital frame depicted on the display. As described above, various image enhanceable products may be produced using the inventive methods described herein and the provision of these products can be completed at the output step in a variety of ways.

Referring to FIG. 7, if the template is to be selected entirely by the system we arrive at step 770, and we arrive at step 780 if some of those template attributes are manually selected by the user. Either way, we arrive at step 1010 of FIG. 10 and the template selection or template completion algorithm begins. If the user has not yet provided images, either in a local computer accessible database, a network accessible database or on a portable or other storage device, then at step 1020 the system will prompt the use to identify where images can be accessed. The prompt may or may not occur if a data base has previously been identified to the system or if a user has coupled a portable or other image storage device to the system.

If manual mode is enabled, the user may decide, at step 1005, to manually select one or more favorite images at step 1030 which are then passed to step 1040. If manual mode is disabled, the users images are automatically selected 1040. The highest scoring template is chosen 1040 by pairing the image set with the available templates in the system. In this instance, the score is not associated solely with the template, rather, it is a score generated by compatibility computation as between image attributes and the required image attributes defined by each of the window recipes in the template recipe. If a user has selected some of the template options, these are not modified by the algorithm. If a user has picked favorite images, these images, or a subset of these images, can be required by programming to be included in the final user enhanceable product and the highest scoring template is selected based on these favorite images being included in the template. Upon completion of template selection in step 1040, if automatic mode 1060 is enabled, the final template is selected, 1070. If automatic option is not turned on, the user has the ability to override 1050 the template selection process until he or she is satisfied. Once the user is satisfied, the final template is selected 1070 and the system now needs to fill this template with images and migrates to decision 1125 in FIG. 11.

Figure 11:
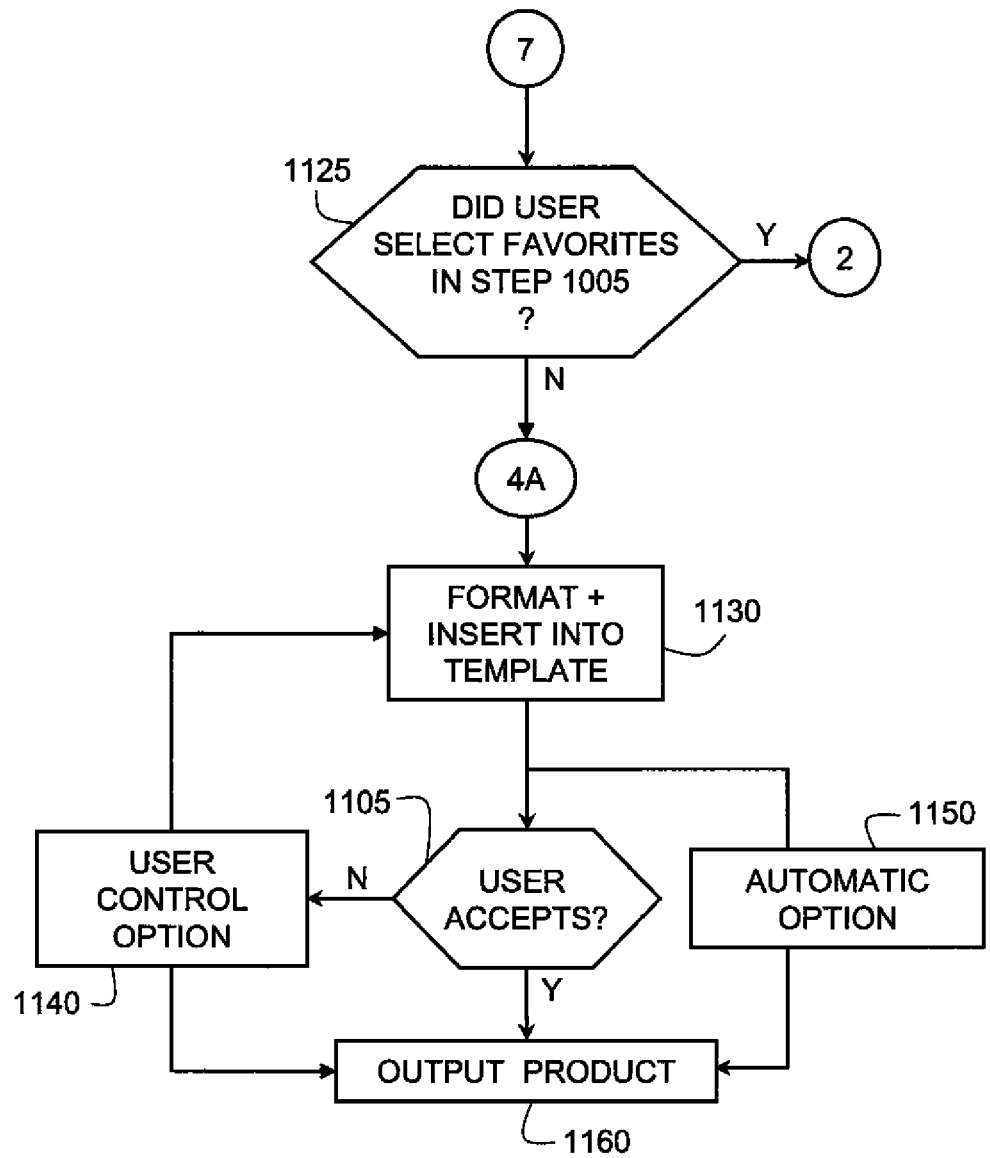
FIG. 11 illustrates a flowchart for image selection.
Figure 12A:
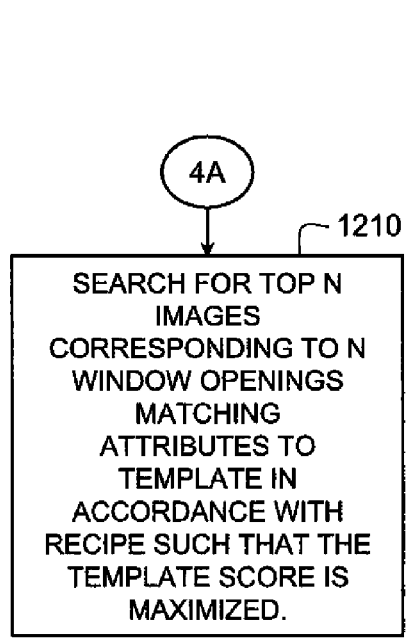
FIGS. 12A-D illustrates algorithms for image searching and compatibility scoring.
Figure 12B:
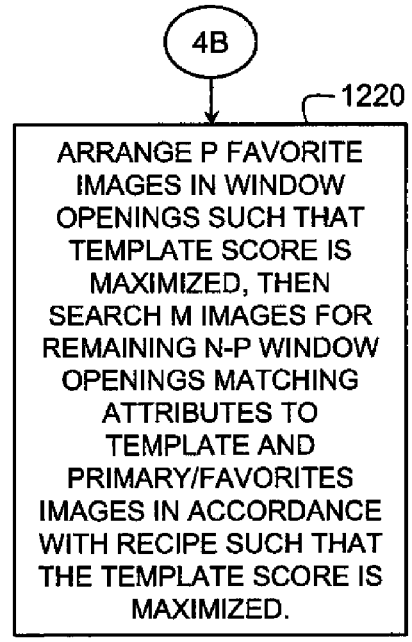
Figure 12C:
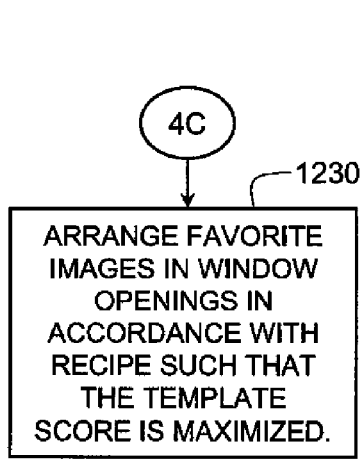
Figure 12D:
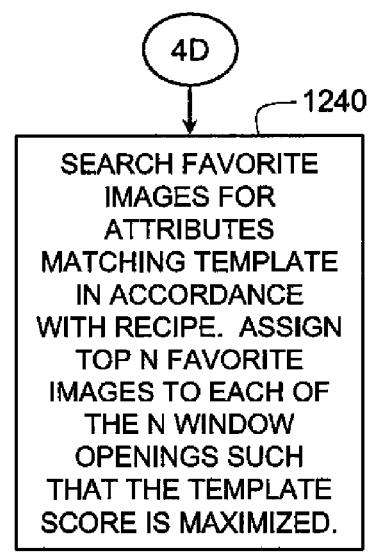

With regard to FIG. 11, the user has already been asked and optionally selected their favorite images. The template was chosen by the algorithm, or optionally overridden by manual controls by the user. All that is left to do is assemble the final product. If favorites were selected, decision 1125 then uses strategies similar to step 930 in FIG. 9, previously described. If no favorite images were selected we utilize image selection step 1210 and formatting in step 1130. If automatic mode 1150 is enabled, the final user enhanceable product is assembled, delivered, printed and/or otherwise outputted 1160. If automatic option is not turned on, the user has the ability to override 1140 the choices made by the image selection process until he or she is satisfied. Once the user is satisfied, the final user enhanceable product is assembled, delivered, printed and/or otherwise outputted 1160.

Regarding the automatic template selection process as shown in FIG. 7, further enhancements and modifications can be achieved with these embodiments of the present invention as follows. For example, each template can be evaluated across multiple criteria such as size, orientation, number of window openings, theme, color, and texture. Upon completion of the automated template selection step 1070, the template with the highest score is the template that is chosen for the user enhanceable product. As described above, all template settings are initially set to defaults at step 720. These default values can be set by the product manufacturer, individual retailer who has installed the image enhanceable product tool described herein, or by individual product line requirements. For example, it is possible to have two side by side kiosks in a store. One kiosk can be programmed with a "Famous Person" Collection version of the software described herein, while the other is a generic unbranded version. If user interactive mode 705 is disabled or if a user chooses at step 715 not to manually select a template, the default options 720 are passed at step 770 on to the automatic template selection module starting with FIG. 10 at start select images 1010.

If a user decides at step 715 to choose their own template, the user can specify the exact template by scanning a template UPC barcode corresponding to a user enhanceable product available at a retailer that has installed a compatible kiosk, or itemized menu or the user can narrow their choices using an interactive interface at step 740 to help choose all the template options. If the user does not specifically provide the exact template or does not provide all template options 725, there is still some ambiguity as to which template that will be used. In such a case, the default template options 720 are superseded by the user defined options 760 and passed 780 on to the automatic template selection module starting with FIG. 10 at start select template 1010.

If the user has provided all the template options at step 725 this results in a specific template to be used 750. We then enter the image selection phase starting at 810 in FIG. 8. If no source of input images can be automatically determined, the user is prompted for such images 820, for example, by displaying a request on a display screen, though other forms of prompting are possible, including an audible signal. If manual mode is enabled, the user may decide to manually select one or more favorite images at step 805. If manual mode is disabled, the user's primary images are automatically selected at step 1210. Before the details of automatic image selection are described, we will first describe the process of the user selecting favorite images at step 830 and the resulting program execution.

The selection of favorite images 830 involves the user previewing, for example, thumbnail size images on the display screen and marking favorite images. The user can select a number of images for n template openings in the previously selected template, where n is equal to the number of window openings in the product. For each image that is split, n is decremented by 1 for each window that the split image occupies. To simplify the description of the algorithm in this embodiment of the invention, we will assume there is no image splitting. In addition to selecting their favorite images, the user is given the option of selecting their overall favorite or primary image. If a primary image is selected, it generally will be displayed in a prominent fashion on the user enhanceable product, and other template opening required image attributes can be based upon the primary image attributes (color, sharpness, person ID, scene content, etc.).

Figure 9:
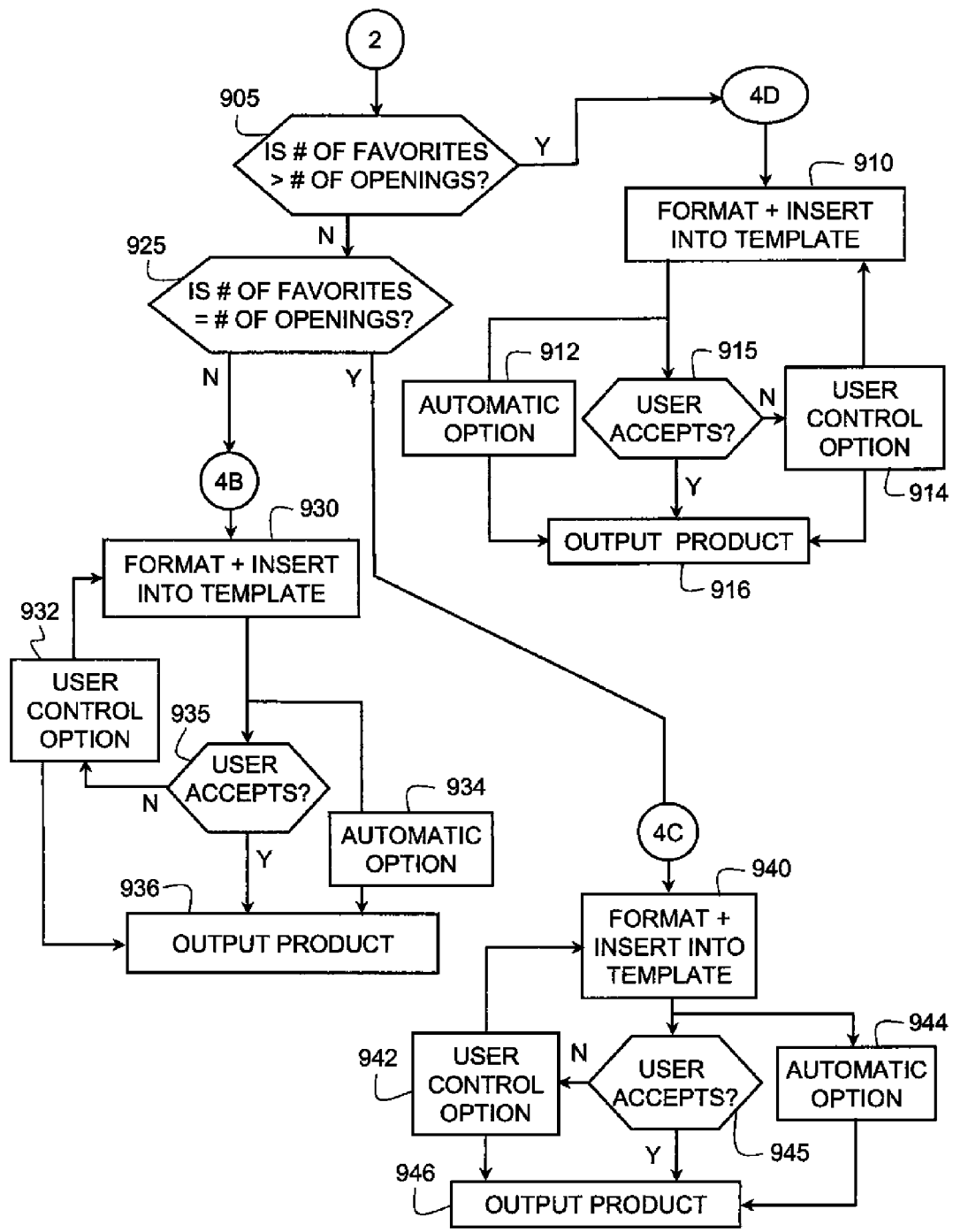
FIG. 9 illustrates a flowchart for image selection.
Figure 10:
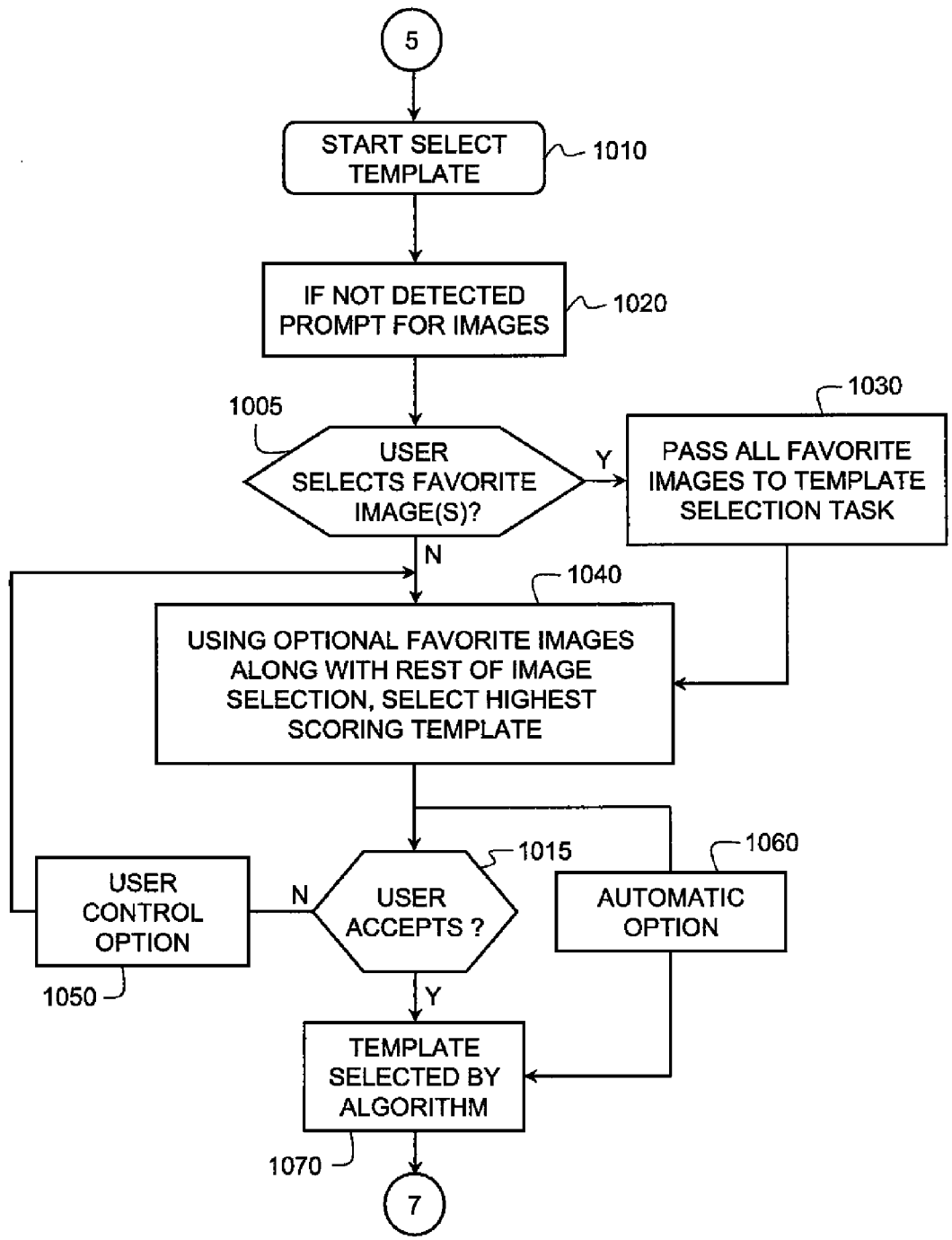
FIG. 10 illustrates a flowchart for template selection.

At step 905, FIG. 9, the user has selected their n favorite images. The first decision 905 is if the number of favorite images selected is greater than the number of window openings in the user enhanceable product. If n<=m at step 905, the next decision 925 is to determine if n, the selected images, is equal to m, the number of window openings. If so, the system then automatically determines which image goes in which window opening 940.

The procedure performed at 940 is as follows. The algorithm analyzes the images and determines what attributes they have either by accessing the metadata or semantic information extracted from the image or both. Both the metadata and semantic information can be calculated and stored with the image, or in a separate file. The fitness score of each image to each window opening is calculated and then the program initializes the template by assigning the highest scoring image to each window opening. If one image has the same score on two window openings, the priority is assigned to the lowest numbered window and the image is assigned to that opening. This presumes that the windows in the template are numbered. For example, window 0 ("W0") is stored, by default, as the highest priority window, window 1 ("W1") is next highest, and so forth. Windows for each template can be assigned numbers internally in a template file or in a window file. If two different images score identically high in one window opening, the image can also be assigned based on metadata fields that record the number of times an image was accessed, randomly, or by another selection method. An overall sum total score for the entire template mapping is computed and is the baseline starting point score before the algorithm iterates through the list of template openings for scoring other image combinations in the windows to determine if the baseline is exceeded. If another combination of images in the window openings results in an overall score higher than the baseline score, then that combination becomes our new highest scoring combination and we update our baseline score accordingly. We proceed until another combination again exceeds the current score or until iterations are programmed to end.

The algorithm updates the overall sum total score after each iteration through the list of template openings and images and can run through all possible combinations, until a set time period expires, or until some other programmed stop. The program can iterate through all images, or a subset, comparing a candidate image's attributes with some or all of the template openings' required attributes and computing new candidate image scores. When a candidate image's new fitness score is higher than a currently assigned image's score the algorithm enters into a potential swap condition.

Once the potential swap condition occurs, the image window's existing image can be scored against the candidate image's currently assigned image window and if both images score higher for both image windows then the swap can be selected. Swapping only happens if both images each score higher in the other opening and increase the template's overall score.

The algorithm will, at some point, contain a list of image windows H and a list of images I. A mapping of images to image windows where $I_1$ maps to $H_1$, $I_n$ maps to $H_n$ results in a fitness measurement score. Each image to image window mapping will be scored based on image attributes and required image window's attributes weighting factor. The algorithm can be selected to run for a computed number of iterations (number of images×number of holes or a subset thereof), until a predetermined fitness score is achieved, until the improvement from iteration to iteration is below a predetermined threshold, or until some other programmed cut off.

For each image window opening, the following are programming options:

The algorithm can swap the existing image $I_i$ with every image $I_r$ in the list of images and perform a weighted attributes fitness measurement score calculation by adding up the attributes weights that the image satisfies and determine if the $I_r$ is a better fit with image window $H_i$.

If, for example, $I_r$ to $H_i$ is a better fit then the program can compare both images' ($I_i$ and $I_r$) scores with their new possible swapped image windows ($H_i$ and $H_r$) to determine if the average weighted attributes fitness measurement score is overall better. If the average fitness measurement score is better the two images' window openings are swapped, if it's not, they are not swapped.

After the processing has occurred for each image window opening in a list, a total score for all image to image window mappings will be computed by summing the entire list of image scores and then comparing with the previous total score. If the newer score is better than the previous solution's score, the previous can be replaced with the newer candidate solution.

If we define imageList as the list of input images and imageWindowList as the list of window openings, the following algorithm can be used to iteratively find the optimal image to window opening configuration when the number of images is the same as the number of window openings:

```
PerformFitting( imageList, imageWindowList)
OverallTemplatescore = 0;
AssignImagesToImageWindows ( );
FOR each image Window in imageWindowList
FOR each image in imageList
Calculate newImageWindowScore
IF newImageWindowScore > imageWindowScore
CheckForSwap(imageWindow, candidateImageWindow)
ENDIF
END FOR
END FOR
FOR each image Window in imageWindowList
ADD the imageWindow.image.score to
OverallTemplatescore
END FOR
RETURN OverallTemplatescore
END PerformFitting
CheckForSwap(imageWindow, candidateImageWindow)
    currentScore =
Calculate2WindowScore(imageWindow, currentimage,
candidateWindow, candidateimage)
    newScore = Calculate2WindowScore(imageWindow,
candidateimage, candidateWindow, currentimage)
IF newScore > currentScore THEN
SwapImage(imageWindow, candidateImageWindow);
ENDIF
END CheckForSwap
AssignImagesToImageWindows( imageList,
imageWindowList )
```

```
    N = NumberImages;
    FOR 1=1:N
        WindowScore[i] = ScoreImage(imageList[i],
        imageWindow[i])
    END FOR
End AssigImagesToImageWindows
ScoreImage( image, imageWindow)
    imageScore = 0
    FOREACH entry in recipe
        imageScore += PerformMeasurement(image,
        recipeEntry);
    END FOR
    RETURN imageScore
END ScoreImage
```

Upon completion of step 940, if automatic mode 944 is enabled, the final user enhanceable product can be assembled, delivered, printed, etc. 946. If automatic option is not turned on, the user has the ability to override 942 the choices made by the image selection process until he or she is satisfied. For example, the user may not like the automatic rearrangement of images done by the automatic algorithm, or it is possible the user may want to select a new image and insert it into the product Once the user is satisfied, the final user enhanceable product can be assembled, delivered, and/or printed 946 as explained above. Referring back to step 905 of FIG. 9, at this point the user has selected their n favorite images. If the number of favorite images n is greater than the number of window openings m in the user enhanceable product the software will select only the top m images. To select the top m images, the metadata and semantic information necessary to fulfill each template opening recipe is automatically extracted from the n images. The individual opening recipes are evaluated for each image at each window opening. As when n=m, such calculations involve a fitness score of each favorite image paired with each window opening, and then the summation of all window opening fitness scores comprises the overall template score.

There are multiple ways to select the optimal image to window opening configuration. The simplest approach is to evaluate the score of each image to each window opening and then assign the highest scoring image to each window opening. If one image has the same score on two window openings, a priority is assigned to each window opening and the image is assigned to the highest priority window opening. If two different images score identically high in one window opening, the image can be assigned based on metadata fields that record the number of times an image was accessed, randomly, or by another programmable procedure.

More sophisticated approaches can be used to maximize the overall template score as a whole. For small m and n, it is reasonable to evaluate all combinations and select the template along with m images arranged having the overall highest fitness score. For large m or n, a linear regression mapping m images to n window openings, where m>n, such as linear least squares or more complex non-linear or iterative approaches can be used, as described below.

Once the top m images are selected, and if automatic mode 912 is enabled, the final user enhanceable product is output 916. If automatic option is not turned on, the user has the ability to override 914 the choices made by the image selection process until he or she is satisfied, at which point the final user enhanceable product 916 is output or assembled, as the case requires.

The third possibility in FIG. 9 is when the number of favorite images n is smaller than the number of window openings m. In this case, the program must search through the user's images and select the top scoring (m−n) images to go along with the n favorites to fill the m window openings. If n and m are small, all possibilities can be tried, and the highest scoring template with the corresponding m favorites and n−m automatically selected images will be used in step 930. Often however, the user image selection can be large, often requiring the analysis of hundreds, and sometimes thousands of images to select the m−n images. In this case, the decision of choosing the highest scoring images to achieve the highest scoring template can be iterative. To speed execution, this process is systematic. If a favorite image is selected it is first evaluated and inserted into the highest scoring window opening. Then other user selected favorite images are inserted into the other window openings such that the highest partial template score is achieved. This leaves (m−n) window openings to fulfill with the user's image collection.

The simplest approach is to evaluate each candidate image to each of the remaining m−n window openings and pick the highest scoring image for each window opening, resolving ties by utilizing a priority with each window opening. When the image selection to pick from is obtrusively large, collecting semantic information for each image can be quite time consuming. A preferred embodiment is to only use recorded metadata to evaluate the fitness of each image as this is fast and can be done on any number of images in a quick fashion. The top x %, or the top p, where x or p is a user defined parameter, images are then selected for further interrogation, by evaluating the semantic information along with the metadata when evaluating the fitness score of each image. Another embodiment of the present invention is to analyze images in a hierarchical fashion. In the first layer, all images are evaluated by metadata alone. The top x % or p images are passed to the second round. In the second round, simpler, or fast semantic algorithms, such as color or histogram semantics are evaluated in the second round, where the top y % or q images are passed to the third round. In the third round, slightly more complex semantic algorithms such as face detection are evaluated and the top z % or r images are passed to the fourth round. In the fourth, final round, the most complex semantic algorithms such as facial recognition, custom object detection are performed. This can be extended to any number of rounds. As we go from the first to last round, the number of candidate images shrinks, but the computational complexity of each analysis increases.

Additional programming features can be optionally implemented as follows:

In step 770, all template selection items were completed by default. In step 780, some of those default selection items were overridden by the consumer. For example, for step 780, all template options may be the same as in step 770 except that the user may override the number of window openings by reducing the total to two. Thus, in FIG. 10, at step 1010, the program begins to determine which template will be selected, given the selection of user imagery. For example, if all user images are identified as fall scenes, then a fall oriented template would score the highest. If no source of input images can be automatically determined by the computer system, the user is prompted for such images 1020. If manual mode is enabled, the user may decide to manually select one or more favorite images 1005. If manual mode is disabled, the users images are automatically selected 1040. The selection of favorite images 1030 can involve the user previewing thumbnail size images on a display screen and marking favorite images. The user can select as many images as desired, however, selection can be limited by program to a number z, where z is equal to the number of window openings in the product with the most window openings, in this example z=2. Therefore, creating and storing a number of templates having the same theme but each with a different number of windows can better accommodate user preferences. Once again, we will assume there is no image splitting. In addition to selecting favorite images, the user is given the option of selecting their overall favorite, primary, or "hero" image.

The highest scoring template is chosen 1040 by pairing the image set with the available templates in the system. If a user has picked favorite images, these images, or a subset of these images can be required by programming to be included in the final user enhanceable product. If a "hero" image is marked, the template selected must have a "hero" window opening that is highly compatible with the "hero" image selected by the user. When scoring each template, each template is initially set to zero. It is possible for a manufacturer or retailer, to bias the creation of some templates over others by purposely initializing such templates at a higher score. For example, templates that generate more royalties, or that are faster to process, or that yield higher quality products may be preset at higher levels to encourage their usage over less desirable templates. Similarly, templates that are not desired may be given negative scores. If a single template is always to be used, it is given a score of positive 1000. Of course, if two or more templates are prescored at 1000, the one with the highest score after image evaluation is chosen. In the case of a tie, all templates can be assigned a numeric priority, and the template with the highest priority is chosen.

The decision of choosing the highest scoring template can be iterative. Each template in the system is evaluated one at a time across all images. To speed execution, this process is hierarchical. If a hero image is selected it is first evaluated across all templates. The top x %, where x is an adjustable/selectable parameter, templates are evaluated further, and the bottom (100–x) % templates are discarded. After the hero selection, the favorite images are scored in each template in each window opening. The highest scoring configuration for each template is stored. If n>m (if user favorite image is greater than window openings), then the selection is complete. If not, the program picks the top y %, where y is an adjustable parameter, and templates are evaluated further, and the bottom (100–y) % templates are discarded. Once again, for the remaining window openings in each remaining template, each image is evaluated and the top scoring templates are recorded. This hierarchical approach greatly speeds up program execution, especially when there are many templates, and many images to evaluate.

After the top scoring template is chosen, in automatic mode 1060, this template is selected by the algorithm 1070 and it along with its chosen images are passed to step 1125 in FIG. 11. If automatic mode is disabled, the user is prompted for acceptance 1015 of the template. If the user rejects this template, the rest of the templates are offered to the user in order of decreasing score. Eventually, the user will select one of the templates 1070 and it passes to step 1125 in FIG. 11.

Referring now to FIG. 13, a sample list of recorded metadata tags obtained from image acquisition and utilization systems including digital stand-alone cameras, cell phone cameras, personal computers, digital picture frames, camera docking systems, imaging appliances, networked displays, and printers. Recorded metadata is synonymous with input metadata and includes information recorded by an imaging device automatically and from user interactions with the device. Standard forms of recorded metadata include; time/date stamps, location information provided by global positioning systems (GPS), nearest cell tower, or cell tower triangulation, camera settings, image and audio histograms, file format information, and any automatic images corrections such as tone scale adjustments and red eye removal. In addition to this automatic device centric information recording, user interactions can also be recorded as metadata and include; "Share", "Favorite", or "No-Erase" designation, "Digital print order format (DPOF), user selected "Wallpaper Designation" or "Picture Messaging" for cell phone cameras, user selected "Picture Messaging" recipients via cell phone number or e-mail address, and user selected capture modes such as "Sports", "Macro/Close-up", "Fireworks", and "Portrait". Image utilizations devices such as personal computers running Kodak Easy Share™ software or other image management systems and stand alone or connected image printers also provide sources of recorded metadata. This type of information includes print history indicating how many times an image has been printed, storage history indicating when and where an image has been stored or backed-up, and editing history indicating the types and amounts of digital manipulations that have occurred.

FIG. 14 contains a sample list of extracted metadata tags obtained from analysis of image content and existing recorded metadata tags. Extracted metadata tags can be created by image acquisition and utilization systems including standalone digital cameras, cell phone cameras, personal computers, digital picture frames, camera docking systems, imaging appliances, networked displays, and printers. Extracted metadata tags can be created automatically when certain predetermined criteria are met or from direct user interactions. An example of the interaction between extracted metadata and recorded metadata is using a camera generated image capture time/date stamp in conjunction with a user's digital calendar. Both systems can be co-located on the same device as with a cell phone camera or can be dispersed between imaging devices such as a camera and personal computer camera docking system. A digital calendar can include significant dates of general interest such as: Cinco de Mayo, Independence Day, Halloween, Christmas, and the like and significant dates of personal interest such as; "Mom & Dad's Anniversary", "Aunt Betty's Birthday", and "Tommy's Little League Banquet". Camera generated time/date stamps can be used as queries to check against the digital calendar to determine if any images were captured on a date of general or personal interest. If matches are made the metadata can be updated to include this new extracted information. Further context setting can be established by including other extracted and recorded metadata such as location information and location recognition. If, for example, after several weeks of inactivity a series of images and videos are recorded on September $5^{th}$ at a location that was recognized as "Mom & Dad's House". In addition the user's digital calendar indicated that September $5^{th}$ is "Mom & Dad's Anniversary" and several of the images include a picture of a cake with text that reads, "Happy Anniversary Mom & Dad". Now the combined extracted and derived metadata can automatically provide a very accurate context for the event, "Mom & Dad's Anniversary". With this context established only relevant theme choices would be made available to the user significantly reducing the workload required to find an appropriate theme. Also labeling, captioning, tagging, or blogging, can be assisted or automated since the event type and principle participants are now known to the system.

The content of image, video, and audio assets can be analyzed using face, object, speech, and text identification and algorithms. The number of faces and relative positions in a scene or sequence of scenes can reveal important details to provide a context for the images. For example a large number of faces aligned in rows and columns indicates a formal posed context applicable to family reunions, team sports, graduations, and the like. Additional information such as team uniforms with identified logos and text would indicate a "sporting event", matching caps and gowns would indicate a "graduation", and assorted clothing may indicate a "family reunion", and a white gown, matching colored gowns, and men in formal attire would indicate a "Wedding Party". These indications combined with additional extracted and derived metadata provide an accurate context that enables the system to select appropriate images, provide relevant themes for the selected images, and to provide relevant additional images to the original image collection.

PARTS LIST 22 housing
24 system
26 system
28 system
29 printer
30 printer
32 I/O
34 processor
35 I/O
38 sensor
39 memory
40 storage
42 storage
44 storage
46 comm
48 memory
50 interface
52 memory
54 system
56 I/O
58 I/O
58a I/O
58b I/O
58c I/O
66 I/O
68 I/O
68a I/O
68b I/O
70 system
72 user
201 sensor
300 image enhanceable item
302 image receiving area
306 window area
308 window area
310 window area
312 inter-window area
320 decorative background image
330 decorative background image
610 image
620 image
630 image
640 image
615 label
625 label
635 label
645 label
640 image
660 image
670 image
705 step
710 step
715 step
720 step
725 step
730 step
740 step
750 step
760 step
770 step
780 step
805 step
810 step
815 step
820 step
830 step
840 step
850 step
860 step
870 step
905 step
910 step
912 step
914 step
915 step
916 step
925 step
930 step
932 step
934 step
935 step
936 step
940 step
942 step
944 step
945 step
946 step
1005 step
1010 step
1015 step
1020 step
1030 step
1040 step
1050 step
1060 step
1070 step
1105 step
1125 step
1130 step
1140 step
1150 step
1160 step
1210 step
1220 step
1230 step
1240 step

The invention claimed is:
1. A computer implemented method of generating an image display with a video camera mounted relative to the display, comprising:
   storing a database of images comprising images of a product inventory;
   storing a plurality of templates each having template attributes and a designated location for disposing a digital image;
   selecting a digital image template whose template attributes match the product inventory;
   detecting an individual within a focal field of the mounted video camera and capturing digital images of the detected individual;

monitoring movements or gestures of the detected individual using the captured digital images;

displaying on at least one electronic display products or information about products from the product inventory in the designated location, wherein the products or the information about products displayed are selected in response to movements or gestures of the detected individual;

receiving information that the product inventory has changed;

updating the digital image template attributes to match a current product inventory; and displaying on the at least one electronic display an updated digital image template and products from the current product inventory.

2. The method according to claim 1 wherein the step of selecting the digital image template includes analyzing sales data associated with at least one product in the product inventory.

3. The method according to claim 1 wherein the step of updating the digital image template attributes includes analyzing sales data associated with at least one product in the product inventory.

4. The method according to claim 1 wherein the step of updating the digital image template attributes is performed at fixed time intervals.

5. The method according to claim 1 wherein the step of updating the digital image template attributes is performed in response to a season of a year input.

6. A computer implemented method of generating an image display with a video camera mounted relative to the display, comprising:

storing a database of images comprising images of a product inventory;

storing a plurality of templates each having template attributes and a designated location for disposing a digital image;

detecting a person within a focal field of the mounted video camera and capturing a digital image of the detected person and a plurality of image elements associated with the person using the mounted video camera;

selecting a digital image template whose template attributes match the product inventory;

displaying on at least one electronic display within view of the person the person and at least one product from the product inventory which replace at least one of the image elements associated with the person;

determining that the product inventory, person attributes, person gestures, person identification, or number of persons within the camera shot has changed;

updating the digital image template attributes based on the changed gestures or persons within the camera shot and on the product inventory; and displaying on the at least one electronic display the person, the updated digital image template and the at least one product from the current product inventory.

7. The method according to claim 6 wherein the step of altering includes the step of adding a personal accessory, clothing, hairstyle, caricature, to the digital image.

8. The method according to claim 6 wherein the step of altering includes altering hairstyles, clothing, accessories, facial complexion, facial expression, facial animation, or body gestures of the person.

9. The method according to claim 6 wherein the step of altering includes the step of altering based on age, height, weight, gender, race, hair color, hair style, facial hair, eyewear, piercings, or hats of the person.

10. The method according to claim 6 wherein the step of altering includes the step of detecting a personal pose, facial expression, or facial animation of the person.

11. The method according to claim 10 wherein the step of altering includes the step of detecting a personal reaction of the person to an object displayed proximate the electronic display.

12. The method according to claim 6 wherein the step of altering includes altering background or foreground location details.

13. The method according to claim 6 wherein the step of altering includes depicting the person using a product.

14. The method according to claim 13 wherein the step of altering further includes adding an audio soundtrack to the displayed digital image.

15. The method according to claim 13 wherein the step of altering further includes animating a digital image of the person using the product.

16. The method according to claim 6, wherein the captured digital image is a motion digital image.

17. The method according to claim 6 including transmitting the altered digital image to an electronic display or printer for completing a sale or for further analysis.

18. The method according to claim 6, further comprising transmitting the altered digital image to a card, a thumb drive, or a removable media in the digital display.

19. The method according to claim 6, further comprising transmitting the altered digital image to an email account, cell phone, PDA, or remote server for later retrieval.

\* \* \* \* \*

UNITED STATES PATENT AND TRADEMARK OFFICE
CERTIFICATE OF CORRECTION

| | | |
|---|---|---|
| PATENT NO. | : 8,390,648 B2 | Page 1 of 1 |
| APPLICATION NO. | : 12/648333 | |
| DATED | : March 5, 2013 | |
| INVENTOR(S) | : Ptucha et al. | |

It is certified that error appears in the above-identified patent and that said Letters Patent is hereby corrected as shown below:

In the Specification

In Column 2, Line 37, delete "the person the person" and insert -- the person --, therefor.

In Column 3, Line 29, delete "illustrates" and insert -- illustrate --, therefor.

In Column 11, Line 22, delete "Man and Cyberneteics," and
insert -- Man and Cybernetics, --, therefor.

In Column 21, Line 12, delete "embodiment embodiment" and insert -- embodiment --, therefor.

In Column 40, Line 16, delete "greater then" and insert -- greater than --, therefor.

In Column 46, Line 39, delete "final round," and insert -- or final round, --, therefor.

In the Claims

In Column 51, Line 45, in Claim 6, delete "the person the person" and insert -- the person --, therefor.

Signed and Sealed this
Tenth Day of June, 2014

Michelle K. Lee
*Deputy Director of the United States Patent and Trademark Office*